United States Patent
Nixon et al.

(10) Patent No.: US 7,848,829 B2
(45) Date of Patent: Dec. 7, 2010

(54) METHODS AND MODULE CLASS OBJECTS TO CONFIGURE ABSENT EQUIPMENT IN PROCESS PLANTS

(75) Inventors: Mark John Nixon, Round Rock, TX (US); Larry Oscar Jundt, Round Rock, TX (US); John Michael Lucas, Lutterworth (GB); Dennis Stevenson, Round Rock, TX (US); Nancy Stevenson, legal representative, Round Rock, TX (US); Julian Kevin Naidoo, Cedar Park, TX (US); Herschel Odis Koska, II, San Marcos, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 909 days.

(21) Appl. No.: 11/537,138

(22) Filed: Sep. 29, 2006

(65) Prior Publication Data

US 2008/0188960 A1 Aug. 7, 2008

(51) Int. Cl.
*G06F 19/00* (2006.01)

(52) U.S. Cl. ......................................... 700/28; 718/101

(58) Field of Classification Search .................. 700/83, 700/28, 17, 18, 26, 87, 97; 718/101; 713/1; 719/315; 707/103, 10
See application file for complete search history.

(56) References Cited

U.S. PATENT DOCUMENTS

| | | | | |
|---|---|---|---|---|
| 5,909,368 | A * | 6/1999 | Nixon et al. | 700/2 |
| 6,385,496 | B1* | 5/2002 | Irwin et al. | 700/87 |
| 7,043,311 | B2* | 5/2006 | Nixon et al. | 700/83 |
| 7,110,835 | B2* | 9/2006 | Blevins et al. | 700/83 |
| 7,117,052 | B2* | 10/2006 | Lucas et al. | 700/83 |
| 2003/0236676 | A1* | 12/2003 | Graham | 705/1 |
| 2005/0096872 | A1* | 5/2005 | Blevins et al. | 702/183 |

* cited by examiner

*Primary Examiner*—Kidest Bahta
(74) *Attorney, Agent, or Firm*—Hanley, Flight and Zimmerman, LLC

(57) ABSTRACT

Methods and module class objects to configure equipment absences in process plants are disclosed. An example disclosed method of creating a configuration entity for use in configuring a process plant comprises creating a class object representative of a process entity within the process plant that includes a first data structure representative of one or more process elements that make up the process entity; and creating a module object based on the class object that includes a second data structure, the second data structure to include a configurable first indication to represent whether a specific process element that conforms to a first one of the one or more process elements that make up the process entity is absent.

62 Claims, 12 Drawing Sheets

USG{UTP=CMU TG='FINE_VALVE' TP=" IGN=T}
       ‾‾‾‾‾‾1405‾‾‾‾‾‾      ‾‾1410‾‾

METHODS AND MODULE CLASS OBJECTS TO CONFIGURE ABSENT EQUIPMENT IN PROCESS PLANTS

FIELD OF THE DISCLOSURE

This disclosure relates generally to process plants and, more particularly, to methods and module class objects to configure equipment absences in process plants.

BACKGROUND

Distributed process control systems, like those used in chemical, petroleum and/or other processes, systems, and/or process plants typically include one or more process controllers communicatively coupled to one or more field devices via any of a variety of analog, digital and/or combined analog/digital buses. In such systems and/or processes, field devices including, for example, valves, valve positioners, switches and/or transmitters (e.g., temperature, pressure, level and flow rate sensors), are located within the process environment and perform process control and/or management functions such as opening or closing valves, measuring process parameters, etc. Smart field devices, such as field devices conforming to any of the Fieldbus protocols may also perform control calculations, alarming functions, and/or other variety of control and/or monitoring functions that may be implemented within and/or by the controller. The process controllers, which may also be located within the plant environment, receive signals indicative of process measurements made by the field devices and/or other information pertaining to the field devices. Based on, for example, the received signals, the process controllers execute a controller application to realize any of a variety control modules, routines and/or software threads to make process control decisions, generate control signals, and/or coordinate with other control modules and/or function blocks being performed by field devices, such as HART and Fieldbus field devices. The control modules in the controller(s) send the control signals over the communication lines to the field devices to control the operation of the process plant.

Information from the field devices and/or the controller is usually made available over a data highway or communication network to one or more other hardware devices, such as operator workstations, personal computers, data historians, report generators, centralized databases, etc. Such devices are typically located in control rooms and/or other locations remotely situated relative to the harsher plant environment. These hardware devices, for example, run applications that enable an operator to perform any of a variety of functions with respect to the process(es) of a process plant, such as changing settings of the process control routine(s), modifying the operation of the control modules within the process controllers and/or the field devices, viewing the current state of the process(es), viewing alarms generated by field devices and/or controllers, simulating the operation of the process(es) for the purpose of training personnel and/or testing the process control software, keeping and/or updating a configuration database, etc.

As an example, the DeltaV™ control system sold by Fisher-Rosemount Systems, Inc. an Emerson Process Management company supports multiple applications stored within and/or executed by different devices located at potentially diverse locations within a process plant. A configuration application, which resides in and/or is executed by one or more operator workstations, enables users to create and/or change process control modules, and/or download process control modules via a data highway or communication network to dedicated distributed controllers. Typically, these control modules are made up of communicatively coupled and/or interconnected function blocks that perform functions within the control scheme based on received inputs and/or that provide outputs to other function blocks within the control scheme. The configuration application may also allow a configuration engineer and/or operator to create and/or change operator interfaces which are used, for example, by a viewing application to display data for an operator and/or to enable the operator to change settings, such as set points, within the process control routines. Each dedicated controller and, in some cases, field devices, stores and/or executes a controller application that runs the control modules assigned to implement actual process control functionality. The viewing applications, which may be run on, for example, one or more operator workstations, receive data from the controller application via the data highway, and/or display such data for process control system engineers, operators, or users using user interfaces that may provide any of a number of different views, such as an operator's view, an engineer's view, a technician's view, etc. A data historian application is typically stored in and/or executed by a data historian device that collects and/or stores some or all of the data provided across the data highway. A configuration database application may run in yet another computer communicatively coupled to the data highway to store the current process control routine configuration(s) and/or data associated therewith. Alternatively, configuration application(s), viewing application(s), data historian application(s), configuration database(s) and/or configuration database application(s) may be located in and/or executed by any number of workstations including, for example, a single workstation.

Example configuration applications include a library of template objects, such as function-block template objects and/or control-module template objects that are used to configure and/or construct a control strategy for a process plant. Example template objects have associated default properties, settings and/or methods such that a process engineer and/or operator can, via a configuration screen, select and/or utilize one or more template objects to develop a control module. During the process of selecting template objects via the configuration screen, the engineer interconnects the inputs and/or outputs of these objects and/or may change their parameters, names, tags and other properties to create a specific control module for a specific use in the process plant. After creating one or more such control modules, the engineer can then instantiate the control modules and download them to the appropriate controller(s) and/or field device(s) for execution during operation of the process plant.

The engineer can also create one or more displays for operators, maintenance personnel, etc. of the process plant by selecting and/or building display objects using, for example, a display creation application. These displays are typically implemented on a system-wide basis via one or more of the workstations, and provide preconfigured displays to the operator or maintenance persons regarding the operating state(s) of the control system(s) and/or the devices within the plant. Example displays take the form of alarming displays that receive and/or display alarms generated by controllers or devices within the process plant, control displays that indicate the operating state(s) of the controller(s) and other device(s) within the process plant, maintenance displays that indicate the functional state of the device(s) and/or equipment within the process plant, etc. In some examples, displays are created through the use of objects that have a graphic associated with a physical and/or logical element and that is communicatively coupled to the physical and/or logical element to receive data about the physical and/or logical element. The object may, for example, change the graphic on a display screen based on the received data to illustrate that a tank is half full, to illustrate the flow measured by a flow sensor, etc.

Similar to the control configuration application, a display creation application has template graphical display items, such as tanks, valves, sensors, operator control buttons like slide bars, on/off switches, etc. that may be placed on a screen in any desired configuration(s) to create an operator display, maintenance display, etc. When placed onto the screen, individual graphic items may be interconnected on the screen in a manner that provides some information and/or display of the inner-workings of the process plant to different users. To animate the graphic display, the display creator manually ties each of the graphical items to data generated within the process plant, such as data measured by sensors or indicative of valve positions, etc. by specifying an association between the graphic item and the relevant data source(s) within the process plant.

While the control template objects within the control configuration application and the display items within the display creation application are convenient because they can be copied and then used to create many different control modules and graphical displays, there is often a need to create numerous copies and/or instances of the same control module and/or graphical display for different equipment within the process plant. For example, process plants have numerous instances of the same and/or similar equipment that can be controlled and/and monitored using the same basic general control module and/or display. To create these numerous control modules and/or displays, however, a general control module and/or display module is created and this general control and/or display module is then copied for each of the different pieces of equipment for which it is applicable. Of course, after being copied, each of the new control and/or display modules must be manually altered in the configuration application to specify the particular equipment to which it is attached. Further, all of these control and/or display modules must then be instantiated and downloaded to the process control system(s).

The control modules and/or displays items discussed above are not modular in any manner, thus, after being copied, each of the control modules and/or displays need be manually and/or individually altered using the appropriate configuration application(s) and/or interface(s) to specify the equipment within the plant to which they are to be associated. In a process plant having numerous copies of the same type of equipment (e.g., replicated equipment), this process is tedious, time consuming and/or fraught with introduced errors. Moreover, once programmed, these different control modules and/or displays are not aware of each other (i.e., information concerning the contents in one display is not available to other displays). Therefore, to make a change to already created control modules, the control and/or configuration engineer must manually make the same and/or similar change(s) to each of the different control modules for the different replicated equipment which, again, is time consuming, tedious and/or fraught with introduced errors. The same problem likewise applies to the graphical views created for the different sets of replicated equipment within the plant. In other words, once a specific control module and/or a specific graphical view is created (individually and/or by being copied from a template object) and then tied to a particular set of equipment within the plant, this control module and/or graphical view exists as a separate entity and/or object within the control system and/or process plant without any automatic awareness of the other control modules and/or graphical displays that are the same and/or similar to it. As a result, changes applicable to one or more control modules and/or graphical displays of a particular type must be made individually to those modules and displays.

Still further, because each control module and display is an individual object, it must be open, in the sense that all of its internal parameters, views, function blocks, and/or other elements must be made available for modification, setting, change and/or viewing by any user. Accordingly, there is no readily available ability to, for example, hide certain elements of these control modules and/or displays, such as proprietary software and methods, alarming activities, etc. from a user of the control modules and/or displays.

SUMMARY

A configuration system for a process plant uses module class objects to assist in configuring, organizing and/or changing the control and/or display activities within the process plant. Each module class object generically models and/or represents a process entity, such as a unit, a piece of equipment, a control activity, etc., and may be used to create instances of the object, called module objects, which represent and/or are tied to specific equipment within the process plant. The module class objects may represent process entities of any desired scope, which means that a single module class object may be used to configure the control and display activities of process entities of any desired scope within the process plant, instead of just at a control module level. In particular, module class objects of a large scope may be used to configure large sections and/or portions of the process plant, which makes configuration of the process plant easier and less time consuming. A module class object may be, for example, a unit module class object reflecting a physical unit within the process plant, an equipment module class object reflecting a physical piece of equipment within the process plant, a control module class object reflecting a control module or scheme within the process plant, or a display module class object reflecting a display routine that provides information to a user within the process plant.

To enhance the use of the module class objects during configuration activities, a module class object may include references to and/or placeholders for other module class objects so that the module objects created from different module class objects may be aware of and/or incorporate one another. In some examples, a unit module class object may include references to equipment module class objects, control module class objects and/or display module class objects, interconnected as necessary with other simple equipment and control modules to form a unit. Likewise, an equipment module class object may include references to control and/or display module class objects while a control module class object may include references to display module class objects.

To further enhance module class objects and/or module objects created and/or instantiated from module class objects, module class objects and/or elements of a module class object include enablement properties such that a configuration engineer can specify, configure and/or identify them and/or any portion of an object created therefrom as absent. Such absent equipment is purposefully absent as it is not required and/or used by and/or within a particular process, equipment, unit, etc., and, thus, differs from unintentionally absent equipment that is absent due to equipment failure, communication failure, installation error, etc. By enhancing module class objects and module objects to accommodate purposefully absent equipment, module class objects and/or module objects can be used to create any of a variety of module object variants that allow each variant to benefit from changes and/or enhancements made to their associated module class objects.

Each module class object owns and/or is tied to the instances (module objects) created from that module class object and, thus, the created module objects are still aware of the module class object. As a result, changes made to the module class object may be automatically propagated to the module objects associated with that module class object, thereby eliminating the need to manually make the same change to multiple control modules and/or display applications within the process plant. Because of this feature, changes to be made to the control and/or display routines associated with each of a number of sets of replicated equipment may be made by making the changes to the appropriate module class objects and having those changes automatically propagated to the module objects created from those module class objects. This eliminates the need to make the same changes to numerous different individual control modules for each of the different sets of replicated equipment. Likewise, binding of the different module objects associated with the same module class object may be performed in a bulk manner, such as using a spreadsheet application that relates the parameters, input and outputs, equipment, etc. of module objects to the different actual devices within the process plant in a single view or screen display. Also, information pertaining to the different module objects associated with a module class object may be hidden from operators or other users because the module class object, to which these users do not have access, may control what information can and cannot be viewed or accessed within the module objects created from that module class object.

DETAILED DESCRIPTION

Process plants often include numerous pieces and/or collections of replicated equipment and/or process entities that perform similar functions and/or processes. The reuse of common and/or shared phase classes, algorithms, configuration, control and/or display routines, etc. across replicated equipment facilitates the efficient configuration and/or operation of process plants. In some examples, replicated equipment includes variants and/or modifications that may still allow a common and/or shared phase class, algorithm, configuration, control and/or display routine to be used. For example, a first process entity having two or more valves could be replicated as a second process entity where one of the valves is intentionally absent. However, because the first and the second process entities share a common structure, they may be controlled using a substantially similar routine. In particular, if the shared routine is aware and/or capable to identify purposefully absent equipment, the shared routine can execute without errors, despite the absent equipment. Methods and class objects to configure, describe and/or specify process entities and that allow a configuration engineer to identify absent equipment are described herein. As described, such class objects, when instantiated to represent a particular piece of equipment, can be configured to represent and/or identify a portion of the equipment as absent. Thus, when a control routine of the class object is executed by a controller to control the particular piece of equipment when the process plant is operating, the controller can identify whether the portion is absent and, if absent, operate to eliminate un-necessary and/or un-meaningful alarms associated with the absent portion.

Figure 1:
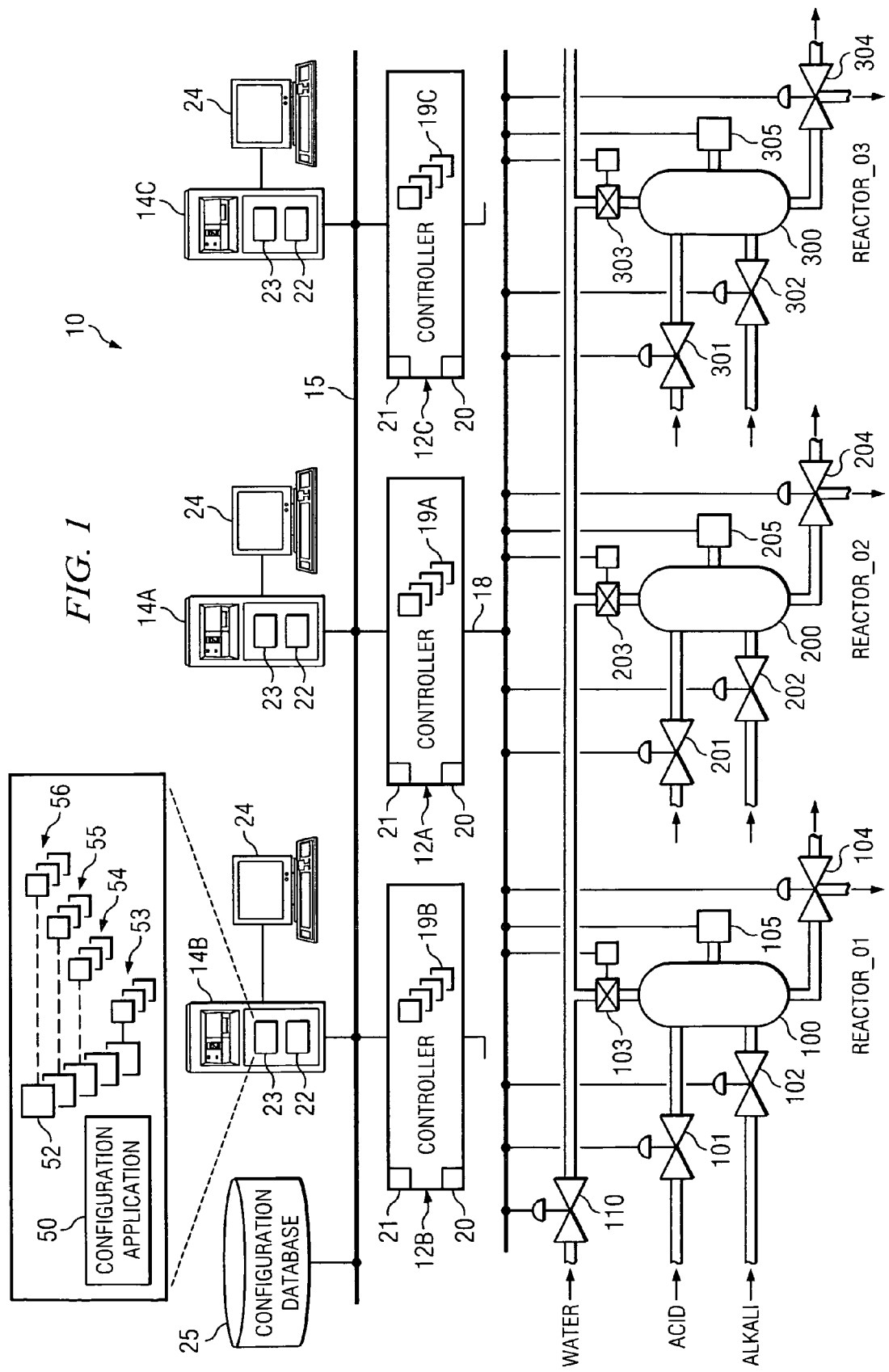
FIG. 1 is a schematic illustration of an example process plant.

FIG. 1 is a schematic illustration of an example process plant 10. The example process plant 10 of FIG. 1 includes any variety of process controllers, three (3) of which are illustrated in FIG. 1 with reference numerals 12A, 12B and 12C. The example process controllers 12A-C of FIG. 1 are communicatively coupled to any variety of workstations, three (3) of which are illustrated in FIG. 1 with reference numerals 14A, 14B and 14C via any of a variety of communication path(s), bus(es) and/or network(s) 15 such as, for example, an Ethernet-based local area network (LAN).

To control at least a portion of the example process plant 10, the example controller 12A of FIG. 1 is communicatively coupled to any variety of device(s) and/or equipment within the example process plant 10 via any of a variety and/or combination of communication lines or buses 18 such as, for example, a communication bus 18 implemented, constructed and/or operated in accordance with a prevailing Fieldbus protocol. While not illustrated in FIG. 1, persons of ordinary skill in the art will readily recognize that the example process controllers 12B and 12C are likewise communicatively coupled to the same, alternative and/or additional equipment and/or devices of the example process plant 10.

The example process controllers 12A, 12B and 12C of FIG. 1 are capable of communicating with control elements, such as field devices and/or function blocks within field devices distributed throughout the example process plant 10 to execute and/or carry-out one or more associated process control routines 19A, 19B and 19C, respectively, to implement a desired control configuration and/or process for the process plant 10. In some example process plants, the controllers 12A-C are DeltaV™ controllers sold by Fisher-Rosemount Systems, Inc. an Emerson Process Management company.

In the example of FIG. 1, the process control routines 19A-C include what are referred to herein as "function blocks." As used herein, a function block is all of or any portion of an overall control routine (possibly operating in conjunction with other function blocks via communications links) used to implement process control loops within the example process plant 10. In some examples, functions blocks are objects of an object-oriented programming protocol that perform any of (a) an input function, such as that associated with a transmitter, a sensor and/or other process parameter measurement device, (b) a control function, such as that associated with a control routine that performs PID, fuzzy logic, etc. control, and/or (c) an output function which controls the operation of some device, such as a valve, to perform some physical function within the process plant 10. Of course, hybrid and/or other types of complex function blocks exist such as model predictive controllers (MPCs), optimizers, etc. While the Fieldbus protocols and/or the DeltaV system protocol use control modules 19A-C and/or function blocks that are designed and/or implemented via an object-oriented programming protocol, the example control modules 19A-C of FIG. 1 could be designed using any of a variety of control programming schemes including, for example, sequential function blocks, ladder logic, etc. and are not limited to being designed using function blocks and/or any particular programming technique and/or language.

To store the example process control routines 19A-C, each of the example process controllers 12A-C of FIG. 1 includes any variety of data stores 20. In addition to storing the process control routines 19A-C, the example data stores 20 of FIG. 1 may be used to store any of a variety of additional and/or alternative control and/or communications applications used to facilitate communication with the workstations 14A-C and/or control elements of the example process plant 10. Example data stores 20 include any variety of volatile (e.g., random-access memory (RAM)) and/or non-volatile (e.g., FLASH, read-only memory (ROM) and/or a hard-disk drive) data storage element(s), device(s) and/or unit(s).

To execute and/or carryout the process control routines 19A-C and/or function blocks, each of the example process controllers 12A-C of FIG. 1 includes any of a variety of processors 21. The example processors 21 of FIG. 1 may be any type of processing unit, such as a processor core, processor and/or microcontroller capable to execute, among other things, machine accessible instructions.

Example workstations 14A-C include any variety of personal computer(s) and/or computer workstation(s). The example workstations 14A-C of FIG. 1 may be used by, for example, one or more configuration engineers to design and/or configure the example process control routines 19A-C that are to be executed by the example controllers 12A-C. The workstations 14A-C of the illustrated example can, additionally or alternatively, be used to design and/or configure display routines to be executed by the workstations 14A-C and/or other computers. Further, the example workstations 14A-C can, additionally or alternatively, communicate with the controllers 12A-C to provide and/or download process control routines 19A-C to the controllers 12A-C. Moreover, the example workstations 14A-C can, additionally or alternatively, execute display routines that receive and/or display information pertaining to the example process plant 10, its elements and/or sub-elements during operation of the process plant 10.

To store applications, such as configuration design applications, and/or display and/or viewing applications, and/or for storing data, such as configuration data pertaining to the configuration of the example process plant 10, each of the example workstations 14A-C of FIG. 1 includes any variety of stores or memories 22. The example stores 22 of FIG. 1 may be any variety of volatile (e.g., RAM) and/or non-volatile (e.g., FLASH, ROM, and/or hard-disk drive) data storage element(s), device(s) and/or unit(s).

To execute the applications that, for example, enable a configuration engineer to design process control routines and/or other routines, to download these process control routines to the example controllers 12A-C and/or to other computers, and/or to collect and/or display information to a user during operation of the process plant 10, each of the example workstations 14A-C of FIG. 1 includes any of a variety of processors 23. The example processors 23 of FIG. 1 may be any type of processing unit, such as a processor core, processor and/or microcontroller capable to execute, among other things, the machine accessible instructions that implement the example methods of FIGS. 15 and/or 16.

The example workstations 14A-C of FIG. 1 can provide a graphical depiction of the process control routines 19A-C associated with the example controllers 12A-C to a user via any variety of display screens 24 that illustrates the control elements within the process control routines 19A-C and/or the manner in which these control elements are configured to provide control of the process plant 10. To store configuration data used by the process controllers 12A-C and/or the workstations 14A-C, the example system of FIG. 1 includes a configuration database 25. The example configuration database 25 of FIG. 1 is communicatively coupled to the controllers 12A-C and the workstations 14A-C via to the example Ethernet-based LAN 15. The example configuration database 25 of FIG. 1 also serves as a data historian by collecting and/or storing data generated by and/or within the process plant 10 for future use and/or recall.

In the illustrated example of FIG. 1, the process controller 12A is communicatively coupled via the example bus 18 to three (3) similarly configured reactors (i.e., replicated equipment) referred to herein as REACTOR_01, REACTOR_02 and REACTOR_03. To provide a master control for controlling the flow of water to each of the reactors, the example process plant 10 of FIG. 1 includes a shared header valve system 110 that is connected on the water line upstream of each of the example reactors REACTOR_01, REACTOR_02 and REACTOR_03.

The example REACTOR_01 of FIG. 1 includes any variety of reactor vessel or tank 100, three (3) input valve systems (i.e., equipment entities) 101, 102 and 103 connected to control fluid inlet lines providing acid, alkali and water, respectively, into the reactor vessel 100, and an outlet valve system 104 connected to control fluid flow(s) out of the reactor vessel 100. A sensor 105, which can be any desired type of sensor, such as a level sensor, a temperature sensor, a pressure sensor, etc., is disposed in and/or near the example reactor vessel 100. In the illustrated example of FIG. 1, the sensor 105 is a level sensor.

Similarly, the example REACTOR_02 of FIG. 1 includes a reactor vessel 200, three input valve systems 201, 202 and 203, an outlet valve system 204 and a level sensor 205. Likewise, the example REACTOR_03 of FIG. 1 includes a reactor vessel 300, three input valve systems 301, 302 and 303, an outlet valve system 304 and a level sensor 305.

Persons of ordinary skill in the art will readily appreciate that the example process plant 10 and/or, more particularly, the example reactors REACTOR_01, REACTOR_02 and/or REACTOR_03 may be used to produce and/or output any variety of products. For example, the reactors REACTOR_01, REACTOR_02 and/or REACTOR_03 can produce salt with the example input valve systems 101, 201 and 301 providing acid, the example input valve systems 102, 202 and 302 providing alkali and the example input valve systems 103, 203 and 303, in conjunction with the shared water header 110, providing water to the reactor vessels 100, 200 and 300. The outlet valve systems 104, 204 and 304 may be operated to send product out of flow lines directed to the right of each of the reactors REACTOR_01, REACTOR_02 and/or REACTOR_03 in FIG. 1 and/or to drain waste or other unwanted material out of a flow lines directed towards the bottom in FIG. 1.

In the example process plant 10 of FIG. 1, the example controller 12A is communicatively coupled to the valve systems 101, 102, 104, 110, 201, 202, 204, 301, 302 and 304 and to the sensors 105, 205 and 305 via the bus 18 to control the operation(s) of these elements to perform one or more processing operations with respect to the example reactor units REACTOR_01, REACTOR_02 and REACTOR_03. Such operations, commonly referred to as "phases" in the industry, may include, for example, filling the example reactor vessels 100, 200, 300, heating the material within the reactor vessels 100, 200, 300, dumping the reactor vessels 100, 200, 300, cleaning the reactor vessels 100, 200, 300, etc.

The example valves, sensors and other equipment 101, 102, 104, 105, 201, 202, 204, 205, 301, 302, 304 and 305 illustrated in FIG. 1 may be any variety of equipment including, but not limited to, Fieldbus devices, standard 4-20 ma devices and/or HART devices, and may communicate with the example controller 12A using any of a variety of communication protocol(s) and/or technology(-ies) such as, but not limited to, the Fieldbus protocol, the HART protocol, and/or the 4-20 mA analog protocol. Other types of devices may, additionally or alternatively, be coupled to and/or controlled by the controllers 12A-C in accordance with the principles discussed herein.

Generally speaking, the example process plant 10 of FIG. 1 may be used to implement batch processes in which, for example, one of the example workstations 14A-C and/or the example controller 12A executes a batch executive routine, which is a high-level control routine that directs the operation of one or more of the reactors REACTOR_01, REACTOR_02, REACTOR_03 as well as possibly other equipment to perform a series of different steps and/or operations (i.e., phases) needed to produce a product, such as a particular type of salt. To implement the different phases, the batch executive routine uses what is commonly referred to as a recipe that specifies the steps to be performed, the amounts and/or times associated with the steps, and/or the order of the steps. Steps for one recipe might include, for example, filling a reactor vessel with the appropriate materials and/or ingredients, mixing the materials within the reactor vessel, heating the materials within the reactor vessel to a certain temperature for a certain amount of time, emptying the reactor vessel and/or then cleaning the reactor vessel to prepare for the next batch run. Each of the steps defines a phase of the batch run, and the batch executive routine within the example controller 12A of FIG. 1 may execute a potentially different control algorithm for each one of these phases. Of course, the specific materials, amounts of materials, heating temperatures, times, etc. may be different for different recipes and, consequently, these parameters may change from batch run to batch run depending on the product being manufactured and/or produced, and/or the recipe being used. Those of ordinary skill in the art will readily appreciate that, while control routines and/or configurations are described herein for batch runs of the example reactors illustrated in FIG. 1, control routines may be used to control any alternative and/or additional devices to perform any alternative and/or additional desired batch process runs and/or to perform continuous process runs, if so desired.

As will also be understood, the same phases and/or steps of a batch process can be implemented on each of the different reactor units REACTOR_01, REACTOR_02, REACTOR_03 of FIG. 1 at the same, overlapping and/or different times. Furthermore, because the example reactors REACTOR_01, REACTOR_02, REACTOR_03 generally include the same number of and/or types of equipment, the same generic phase control routine(s) for a particular phase may be used to control each of the different reactor units. However, this generic phase control routine may have to be modified to control the specific hardware and/or equipment associated with the different reactor units. For example, to implement a fill phase for REACTOR_01 (wherein the example tank 100 is filled), an example fill control routine 19A will open one or more valves associated with the input valve systems 101, 102 and 103 for a certain amount of time, for example, until the example level meter 105 senses that the example vessel 100 is full. However, this same control routine 19A may be used to implement a fill phase for REACTOR_02 by merely changing the designation of the input valve(s) to be those associated with the valve systems 201, 202 and 203 instead of the valve systems 101, 102 and 103 and by changing the designation of the level meter to be the level meter 205 instead of the level meter 105.

As will be discussed below in connection with FIG. 5, control routines and/or module class objects may be constructed and/or utilized to represent and/or encompass any scope of equipment within a process plant. An example module class object represents the example valves 101, 102, 201, 202, 301, 302, while another example module class object represents the reactors REACTOR_01, REACTOR_02 and REACTOR_03. As will be explained, such objects facilitate the reuse of control routines 19A-C across any number of similarly configured (e.g., replicated) equipment. However, in some examples, similarly replicated equipment may differ in that any particular portion, sub-element and/or device of the equipment may be purposefully absent. As described below in connection with FIGS. 8-16, such purposefully absent portions, sub-element, devices and/or equipment may be identified by, for example, a configuration engineer as absent and, thus, subsequently ignored by the example process controllers 12A-C during execution of the process control routines 19A-C. Accordingly, process control routines 19A-C can be reused and/or utilized for variants of replicated equipment even if a particular instance of the equipment includes an absent portion, sub-element and/or device.

Persons of ordinary skill in the art will readily appreciate that such identification of absent elements of a unit of a process plant may occur at any scope of equipment within the process plant. In an example, REACTOR_02 may be similar to the example REACTOR_01 except that the valve 202 is purposefully absent and, thus, to be ignored by the processing routines 19A-C. In another example discussed below in connection with FIGS. 2 and 3, the example valves 101, 102, 103, 201, 202, 203, 301, 302 and 303 include a FINE_VALVE and a COARSE_VALVE. However, within an example process plant, some instances of the valves 101, 102, 201, 202, 301, 302 and/or 110 may not, for example, include a FINE_VALVE. By facilitating, during configuration of the process plant, the identification of such FINE_VALVEs as absent, a common control procedure 19A-C can be utilized to control the valves 101, 102, 201, 202, 301, 302 and/or 110 regardless of whether or not their respective FINE_VALVE is present.

While an example process plant 10 has been illustrated in FIG. 1, the controllers 12A-C, workstations 14A-C, buses 15 and 18, control devices, etc. illustrated in FIG. 1 may be divided, combined, re-arranged, eliminated and/or implemented in any of a variety of ways. Further, the example process plant 10 may include any variety of additional and/or alternative controllers, workstations, buses, control devices than those illustrated in FIG. 1 and/or may include more than the number of controllers, workstations, buses, control devices illustrated in FIG. 1. For example, a process plant may include any number of controllers and/or workstations.

Further, a process plant may include any of a variety of process entities instead of and/or in addition to the example reactors illustrated in FIG. 1. Further still, a process plant may produce of a variety of products using any of a variety of processes. Accordingly, persons of ordinary skill in the art will readily appreciate that the example process plant 10 of FIG. 1 is merely illustrative. Further yet, a process plant may include and/or encompass one or more geographic locations including, for example, one or more buildings within and/or nearby a particular geographic location. Also, while the example process plant 10 of FIG. 1 will be used to describe the example methods and module class objects for configuring the absence of equipment, persons of ordinary skill in the art will readily appreciate that the methods and objects disclosed herein may be used to configure the absence of equipment for any of a variety of process plants.

Figure 2:
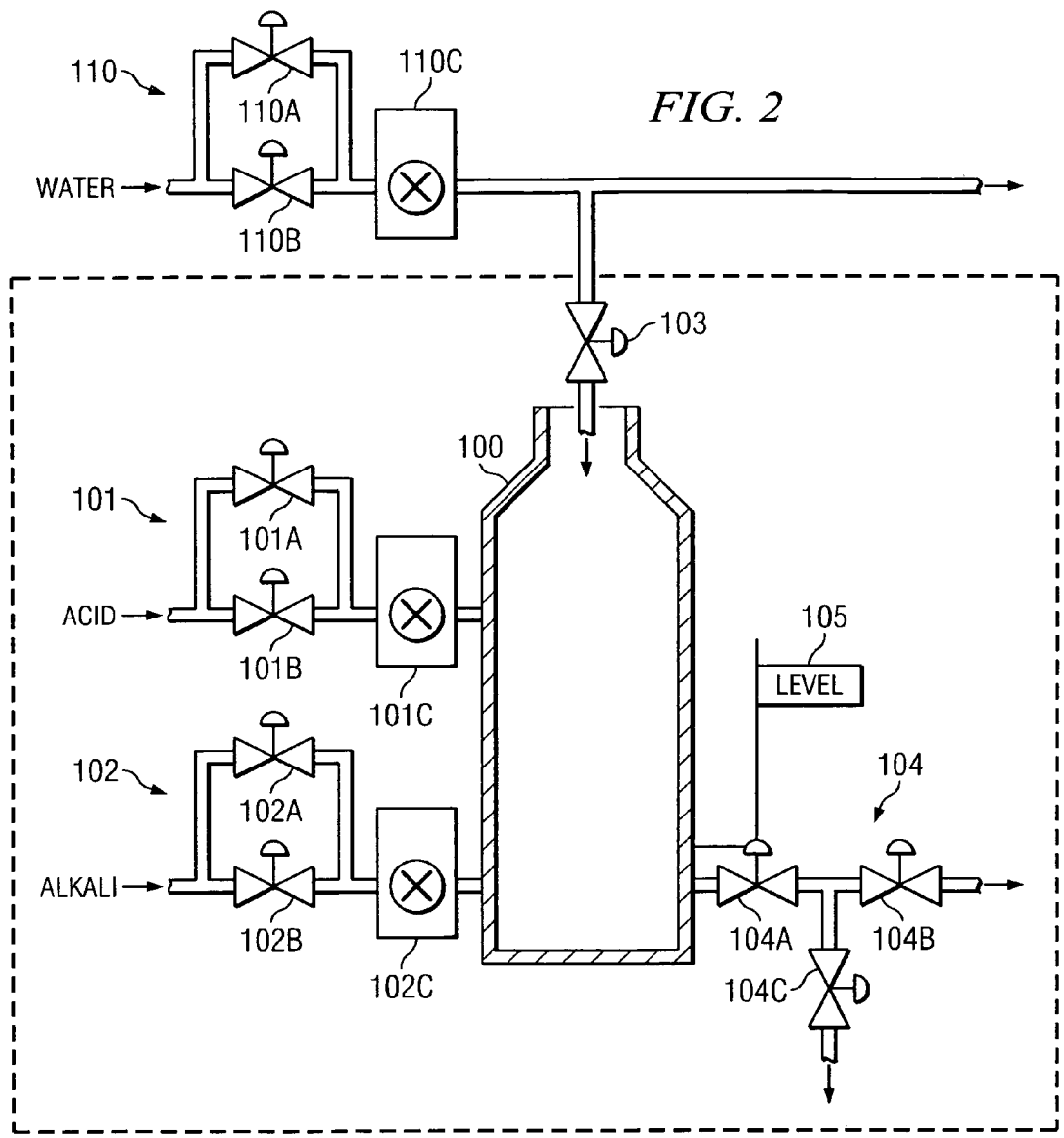
FIG. 2 illustrates an example manner of implementing the example reactor units of FIG. 1.

In general, reactors create an output product by combining one or more ingredients using one or more process steps. Example reactors may be constructed and/or implemented using any of a variety of valve(s), tank(s) and/or sensor(s). FIG. 2 illustrates an example manner of implementing any of the example reactors REACTOR_01, REACTOR_02, REACTOR_03 of FIG. 1. While any of the example reactors REACTOR_01, REACTOR_02, REACTOR_03 can be represented by FIG. 2, for ease of discussion, the device of FIG. 2 will be referred to as REACTOR_01. In general, as discussed above in connection with FIG. 1, the example REACTOR_01 of FIG. 2 includes the example reactor tank 100, the example input valves systems 101, 102, 103 and 110 for the input of acid, alkali and water into the tank 100, the example outlet valve system 104 for removing material from the tank 100 and the example level sensor 105. In more detail, each of the example input valve systems 101, 102 and 110 of FIG. 2 uses a similar equipment entity (i.e., are replicated equipment), referred to herein as a "totalizer," which, as illustrated in FIG. 2, includes two valves disposed in parallel with one another and a flow measurement device disposed downstream of the two valves.

To provide coarse flow control, the example totalizer 101 includes a COARSE_VALVE 101A. The example COARSE_VALVE 101A is any one of a variety of on/off type valves. To provide fine flow control, the example totalizer 101 includes a FINE_VALVE 101B. The example FINE_VALVE 101B is any one of a variety of on/off type valves. The maximum achievable flow rate through the FINE_VALVE 101B is lower than that achievable through the COARSE_VALVE 101A. Thus, the collective use of the COARSE_VALVE 101A and the FINE_VALVE 101B facilitates flow rate control over a wide range of flow rates.

To measure the flow rate through the example totalizer 101, the example totalizer 101 of FIG. 2 includes a flow meter 101C disposed downstream of the example valves 101A and 101B. The example totalizer 101 of FIG. 2 has one or more control modules or routines (e.g., one of the example control routines 19A-C of FIG. 1) associated therewith that are used to control the input of the acid using the measurements made by the example flow meter 101C. A first, such control routine may perform fast flow control through the totalizer 101 using the COARSE_VALVE 101A and the FINE_VALVE 101B while a second such control routine may perform accurate flow control through the totalizer 101 by controlling the COARSE_VALVE 101A and the FINE_VALVE 101B differently.

As will be readily understood from FIG. 2, the alkali input valve totalizer 102 includes a COARSE_VALVE 102A, a FINE_VALVE 102B, and a flow meter 102C and the shared water input valve system 110 includes a COARSE_VALVE 110A, a FINE_VALVE 110B, and a flow meter 110C. In the example of FIG. 2, each of the example totalizers 101, 102, and 110 represent replicated equipment and, thus, even though they are used at different places of the example REACTOR_01 unit can, accordingly, be viewed of as instances of a common totalizer object and, thus, can controlled via a common set of control routines.

Persons of ordinary skill in the art will readily recognize that there are numerous variants of the example totalizers 101, 102 and 110 of FIG. 2. For instance, a modified totalizer 101M illustrated in FIG. 3 can be constructed from the example totalizer 101 of FIG. 2 by not including the FINE_VALVE 101B. That is, the example FINE_VALVE 101B of FIG. 2 is purposefully absent from the example totalizer 101M of FIG. 3. In such an instance, the FINE_VALVE 101B is purposely absent because it may not, for example, be needed to properly perform the process and/or process phase(s) to be performed by the example REACTOR_01. However, persons of ordinary skill in the art will readily recognize that the modified totalizer 101M is similar to the example totalizer 101 other than the missing FINE_VALVE 101B and, thus, may be controlled using a control procedure that is substantially similar to that used to control the example totalizer 101 of FIG. 2. Depending upon the requirements of a process and/or process phase, the example modified totalizer 101M could be used in place of any of the example totalizers 101, 102 and/or 110 of FIG. 2.

Figure 4:
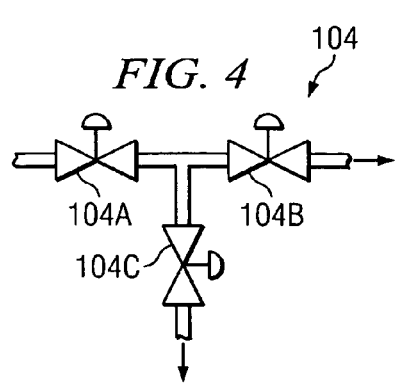
FIG. 4 is a schematic illustration of the example outlet valve system of FIG. 2.

Returning to FIG. 2, the example outlet valve system 104 is another piece of replicated equipment and includes three valves. As illustrated in FIG. 4, the example outlet valve system 104 includes a main outlet valve 104A that must be opened for any material to be released from the example tank 100 of FIG. 2, a product valve 104B that must be opened in conjunction with the main outlet valve 104A to deliver product from the tank 100, and a drain valve 104C that must be opened in conjunction with the main outlet valve 104A to drain material, such as waste product, cleaning fluids, etc. from the tank 100 into a drainage and/or refuse system. Of course, one or more control routines are associated with the outlet valve system 104 to control the states of the valves 104A, 104B and 104C to close the tank 100, to drain the tank 100 and/or to empty product from the tank 100.

Returning to FIG. 1, in the past, to produce a control routine for controlling the different equipment associated with the example reactors REACTOR_01, REACTOR_02 and/or REACTOR_03, a configuration engineer may have first created a number of template control modules which were generic in nature and that were stored in a library in, for example, one of the example workstations 14A-C. To create a template control module, the engineer graphically connected together different function blocks to provide a control routine for different elements and/or loops executed in connection with the reactor. Once the generic template control modules were created, typically on a valve and/or a control loop basis, these template control modules could be copied, and the copies of the template control modules could be manually bound to particular equipment within the process plant 10 (e.g., to a particular piece of equipment within the reactors REACTOR_01, REACTOR_02 and REACTOR_03). Once bound, either directly and/or using alias names, as more specifically described in U.S. Pat. No. 6,385,496, the bound copies of the control modules were downloaded to one or more of the example controllers 12A-C and used to perform process control activities in conjunction with the reactors to which they were bound. However, the bound control modules created from the template control modules had no reference and/or relationship to the template module from which they were created and, thus, were, in effect, stand-alone control modules or objects when used in the process control system. U.S. Pat. No. 6,385,496 is hereby incorporated by reference in its entirety.

Also, in these systems, configuration activities had to be performed at a control module level, meaning that a separate control module had to be created for each of the different pieces of equipment and/or loops within the process plant. At the control module level, there are typically numerous different types of control modules that must be created for and bound to each of the process entities within the process plant. As a result, the configuration engineer spent a great deal of time simply copying and binding individual control modules to individual pieces of equipment within the plant. For example, a configuration engineer may have had to create and copy dozens of control modules for a reactor unit in the plant and then bind each of these control modules to particular equipment within that reactor unit. When the reactor unit was replicated in the plant, the configuration engineer's task became much more tedious because the configuration engineer had to perform this copying and binding process for dozens of control modules for each of the replicated equipment, which was time consuming and fraught with human-introduced errors.

While, in the past, a configuration engineer could develop a unit module, these unit modules were merely containers for the phases that could be run on a unit and did not include equipment indications associated with the unit or control schemes used to control basic operations of the equipment within the units. Also, while templates could be created for control elements used to control different equipment, there were no packages of control modules that could be used to indicate higher-level replicated entities within the plant, such as equipment and unit entities (e.g., a totalizer or reactor). In other words, to create control routines for different replicated entities within the process plant 10, the configuration engineer had to copy control modules for each of the replicated pieces of equipment at the lowest level of control and then tailor each one of these control modules to a specific and/or particular piece of equipment or other entity within the process plant 10. In large plants with large numbers of replicated equipment, this task could be time consuming and/or fraught with configuration errors. Still further, changes to a control module associated with replicated equipment had to be made manually to each of the different control modules for the different equipment, which was also tedious, time consuming and/or fraught with introduced errors. Likewise, operator displays had to be created separate and/or apart from the control modules and, similar to the control modules, the displays had to be individually created, modified and tied to the equipment within the process plant.

To make the creation and/or changing of a process configuration easier and/or less time consuming, a configuration application 50 executed by at least one of the example workstations 14A-C of FIG. 1 utilizes a set of one or more module class objects 52 for use in configuring the process control plant 10. The example module class objects 52 of FIG. 1 are especially useful when configuring a plant with numerous sets of replicated equipment, including replicated equipment that may include purposefully absent portion(s). Generally speaking, a different module class object 52 can be created for each different type of physical unit and/or equipment that is replicated and/or used within the process plant 10, for each type of control activity that is replicated and/or used within the process plant 10, for each different type of display application that is replicated and/or used in the process plant 10, etc. Once created, the example module class objects 52 of FIG. 1 can then be used to configure elements of the process plant 10 that correspond to the various module class objects 52.

The example module class objects 52 of FIG. 1, represent generic versions of process entities and, thus, are not tied to any particular physical process entity. In the illustrated example, module class objects 52 can have associated lower-level objects and/or instances, four (4) of which are illustrated in FIG. 1 with reference numerals 53, 54, 55 and 56. When a module object is created from a module class object 52 it inherits the same structure and/or properties as the module class object 52 from which it was created. However, each module object is tied to a particular physical entity within the process plant 10. Thus, a single module class object 52 may be created to represent a particular type of reactor unit (no matter how many of those reactor units are present within the plant 10), while a different module object exists and/or is created for each of the different reactor units of that type actually present within the plant 10.

The module objects created from the module class object 52 are associated with and/or owned by the module class object 52. As a result, changes made to the associated module class object 52 can be automatically reflected in and/or propagated to each of the module objects associated with the module class object 52. Therefore, when a number of module objects have been created from a particular module class object (e.g., the module class object 52), with each of the different module objects tied to different process entities, each of the different module objects can be changed by simply changing the module class object 52 and then automatically propagating the changes down to the associated module objects.

Similarly, once the module objects have been created from a module class object 52, these module objects can be bound to particular equipment within the process plant 10 using a bulk editing method. In particular, because the module objects of a particular module class object 52 are all coupled to and/or owned by the same module class object 52, they may all be configured together using, for example, a spreadsheet type application, which makes specification of the particular relationships between the module objects and the particular equipment in the plant 10 associated with those module objects easier and/or less time consuming. Example methods for configuring a set of module objects using a spreadsheet type application are described in U.S. Pat. No. 7,043,311, which is hereby incorporated by reference in it entirety.

The example module class objects 52 of FIG. 1 are commonly referred to in the industry as "objects" of an object-oriented programming environment and/or language. As a result, these module class objects 52 have the ability to own and/or to refer to other objects. Generally speaking, the module class objects 52 are high-level objects that can include indications and/or definitions of individual elements such as control routines, equipment and/or other elements associated with a process entity along with a definition and/or indication of the manner in which those individual elements interact with one another, such as the way in which physical elements are interconnected and/or the way in which logical elements operate in conjunction with the physical elements. In other words, a module class object 52 may be an object within, for example, an object-oriented programming language, that provides the basis for control and/or viewing of a particular piece of and/or group of equipment, a control element, a display, etc. within the process plant 10, and may be useful for creating many instances of that element to be used to configure different replicated equipment within the process control plant 10.

Basically, each of the example module class objects 52 of FIG. 1 is a configuration container and/or template that includes a generic definition of a process entity in the form of all of the different control and/or display applications and/or routines that are applicable to that entity to be used by the example controllers 12A-C to control that entity and/or by the example workstations 14A-C to perform display activities with respect to that entity. A module class object 52 may represent a process entity of any nature, such as a unit, a piece of equipment, a control entity, a display application, etc. During the configuration of the process plant 10, the module class object 52 may be used to create configuration instances of the process entity for any number of different process entities that conform to the definition provided by the module class object 52, with each configuration instance (the module object created from the module class object 52) being associated with and/or tied to a different actual process entity. These different module objects include, among other things, control routines and/or display routines bound to particular process entities as disposed within the process plant 10, with these control routines being able to be downloaded and/or used within the controllers 12A-C of FIG. 1 to perform actual control activities on the process entities and/or with the display routines being able to be downloaded to workstations 14A-C to perform actual display activities with respect to the entities during operation of the process plant 10.

Different types of module class objects 52 may reflect process entities of different scopes and, therefore, contain control and/or display routines configured to operate on and/ or with respect to process entities of different scope. The larger the scope of the process entity, such as a unit, the more control and/or display routines will typically be associated with the module class object and, thus, the easier it is to configure larger sections and/or portions of a process plant using those module class objects. However, the larger the scope of the process entity associated with a module class object 52 the lower the likelihood that the process will include replicated equipment at that scope and, thus, the lower the likelihood that the module class object 52 is useful on a large scale. Conversely, the lower the scope of the process entity associated with a module class object 52, the greater the likelihood that the module class object 52 will be useful in various different locations of the plant, but the lower the amount of configuration that is performed when using that module class object 52 in any particular instance. In any event, the module class objects 52 enable configuration to be performed for different replicated equipment at higher levels of abstraction than at the control module level, which makes configuring a process plant with replicated units and/or other equipment easier, less time consuming, and/or with fewer configuration errors when using module class objects 52, especially module class objects 52 of a large scope, such as at the unit level.

Figure 3:
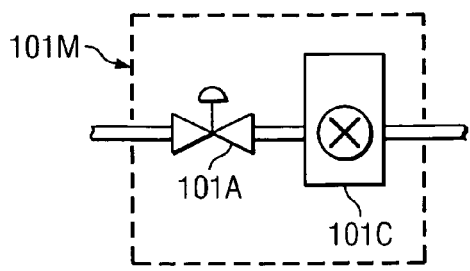
FIG. 3 illustrates an example modified totalizer that may be used in any of the example reactors of FIGS. 1 and 2.

In some examples, when configuring a process control system, a configuration engineer may create a single module class object 52 for the different elements replicated within the process plant, such as for the example totalizers 101, 102, 110, 110M of FIGS. 2 and 3. Thereafter, the configuration engineer may create instances of the module class object 52 (i.e., module objects) for each of the totalizers physically present in the process plant. Each such created module object includes control routines used by a process controller to operate a totalizer and is specifically tied to and/or bound to the equipment within a particular totalizer. These control routines can then be downloaded to the controller and then used during operation of the process plant 10. However, once created, each of the module objects is still tied to its associated module class object 52 and, thus, can be controlled by the module class object 52 to be changed, to provide and/or reject access to the module object, etc.

While there are many different possible types of module class objects 52 that can be created and/or used within a process plant 10 to perform configuration activities within the process plant 10, four specific types discussed herein as examples include unit module class objects, equipment module class objects, control module class objects and display module class objects. Generally speaking, each different type of module class object 52 is designed and/or intended for a different scope of control and/or use within the process plant 10. A unit module class object 52 is intended to be used to represent and/or to configure control activities for a broad scope of equipment within a process plant. In particular, a unit module class object 52 is intended to model and/or be used to configure an inter-related set of equipment (typically replicated equipment) such as, for example, the example reactors of FIG. 1, having individual elements that work in concert and/or interoperate with one another in some known manner.

An equipment module class object 52 is intended to be used to represent and/or to configure control activities for a less broad scope of physical equipment within the process plant 10. The equipment associated with an equipment module class object 52 is generally one or more physical entities, such as valves, flow meters, etc. that make up a subsystem of a unit (e.g., the example totalizers of FIGS. 2 and 3) and the equipment module class object 52 may include one or more commands and/or algorithms, which may be command-driven algorithms (CDAs), state-driven algorithms (SDAs), sequential flow chart (SFC) algorithms, function block diagram (FBD) algorithms, phase algorithms, etc., to be performed on the piece of equipment. Thus, an equipment module class object 52 is aimed at configuring the control of multiple low-level components and/or entities within a unit (e.g., the example COARSE_VALVE 101A, the FINE_VALVE 101B and/or the example flow meter 101C of FIG. 2) to provide a basic set of functions on that equipment as used within the unit. As is known, a command-driven algorithm (command-driven control logic) is used when the low-level components must be coordinated through multiple steps to accomplish a function. For example, a first valve may need to be opened for a particular amount of time and then closed while a second valve is opened and then closed. The example totalizers of FIGS. 2 and 3 use this type of command-driven algorithm to first initiate and then manipulate the COARSE_VALVE (e.g., the example COARSE_VALVE 101A) and the FINE_ VALVE (e.g., the example FINE_VALVE 101B) based on the readings of the flow meter (e.g., the example flow meter 101C) to provide the desired total flow through the totalizer. A state-driven algorithm (state driven control logic) may specify the states of different low-level components which can be manipulated in a single step. Such a state-driven algorithm might be used to control the example outlet valve system 104 of FIG. 4 in which the states of the different valves therein are controlled differently (but in a single step) based on the desired state of the outlet valve system 104 to close the tank 100, to drain the tank 100 and/or to deliver product from the tank 100. However, equipment module classes may be controlled using any applicable control algorithm.

A control module class object 52 is intended to be used to represent and/or to configure individual control elements and/or control modules within the process plant 10. A control module class object 52 provides and/or specifies a particular type of control to be performed on a plant entity, such as a valve, meter, etc., a piece of equipment and/or even on a unit. Generally speaking, a control module class object 52 provides a particular type of control programming, such as a set of communicatively interconnected function blocks defining some control module to be executed in a controller and useful to perform replicated control activities within a process plant. In most cases, a control module class object 52 may provide a generic control strategy to manipulate a single device and/or a related set of devices.

A display module class object 52 is intended to be used to represent and/or to configure display activities to be viewed by a user, such as to a control operator, during operation of the process plant 10. Thus, a display module class object 52 may specify the programming needed to generate a display of a certain type within an operator workstation (e.g., any of the example workstations 14A-C of FIG. 1) and/or the programming needed to be run in one or more of the workstations (as well as any other device(s) within the process plant 10) to enable that display to obtain the proper data and/or information from the plant during operation of the plant 10. Types of display class module objects 52 include, for example, alarm displays, configuration viewing displays, operation viewing displays, diagnostic displays, etc. Of course a display module class object 52 may provide a display representing and/or tied to any desired scope of physical elements and/or entities within a process plant. For example, a display module class object 52 may display information about an entire area, a unit, a piece of equipment, a control element, or any combination of these elements within the process plant 10.

Further, as discussed in more detail below, a module class object 52 can be defined and/or configured to permit all or any particular portion(s) of a module object (e.g., the example FINE_VALVE 101B of the example totalizers 101, 102, 110 of FIG. 2) to be configurably identified as absent and, thus, ignored during subsequent execution of associated control routines. When such an module class object 52 for a totalizer is instantiated and then associated with a specific physical totalizer of a process plant (i.e., a module object is created), the absent piece of equipment (e.g., the FINE_VALVE 101B) can be identified and/or marked as absent by the configuration engineer to represent a modified totalizer (e.g., the example modified totalizer 101M of FIG. 3). Such an example totalizer module class object 52 may include and/or define one or more control routines that can include checks for the presence of the potentially absent piece of equipment and, thus, can execute correctly (e.g., without absent equipment error messages) whether or not the allowably absent piece of equipment is actually present. Such a control procedure is appropriate for both the example totalizer 101 of FIG. 2 and the example modified totalizer 101M of FIG. 3. Accordingly, such a flexible totalizer module class object 52 is capable of representing and owning any of a variety of variants of a totalizer.

Thus, in the illustrated examples described herein, a particular physical modified totalizer 101M can be an instantiation of a totalizer module class object 52 and, thus, updates to the module class object 52 (e.g., an updated control procedure 19A) can be automatically applied to the modified totalizer 101M. If the totalizer module class object 52 did not include an ability to purposefully identify an absent portion of the equipment, a separate module class object 52 for the modified totalizer 101M would have been required. Such a separate module class object 52 would have to be separately maintained and/or updated even though the two module class objects 52 represent similar equipment. However, because the example modified totalizer 101M can be created as an instantiation of the totalizer module class object 52, the example totalizer 101 and the modified totalizer 101M can be configured and/or controlled via a common totalizer module class object 52 and, thus, utilize a shared and/or common set of control routines.

While the above absent equipment example was described with reference to a totalizer module class object 52, persons of ordinary skill in the art will readily recognize that module class objects 52 that include an ability to identify purposefully absent equipment and/or portions can be defined and/or created for any scope of equipment and/or units with a process plant. For example, a reactor module class object 52 that permits a particular totalizer to be absent could be defined.

A process plant can be represented by a hierarchy of module class objects having interconnections that represent the instantiations of module objects from particular module class objects. Such hierarchical diagrams may also represent the implementation of larger process entities from a set of two or more smaller process entities. FIG. 5 illustrates hierarchical interconnections between the different types of module class objects 52 used by the configuration application 50 of FIG. 1. FIG. 5 also illustrates the interrelationship between module class objects 52 and module objects developed from those module class objects 52. Starting at the top of FIG. 5, module class objects 52 are separated by module class type into one of a unit module class type 400, an equipment module class type 402, a control module class type 404 and a display module class type 406. Of course, other types and/or classes of module class objects 52 may be defined, provided and/or used as well, with the four types illustrated herein being merely illustrative examples. For example, there may be any of a variety of additional and/or alternative module class object types used to represent a process plant. Example individual module class objects (which may be, for example, high-level objects of, for example, an object-oriented programming language) are represented in FIG. 5 with a double outline for the sake of clarity and fall under each of the different types of module classes 400, 402, 404 and 406.

An example reactor unit class module object 410 represents a particular type and/or configuration of a reactor within a process plant (e.g., the example reactors of the example process plant 10 of FIG. 1). Likewise, an example packager unit module class object 412 represents a particular type and/or configuration of a packaging unit within the process plant 10, and an example dryer unit class module object 414 represents a particular type and/or configuration of dryer unit within the process plant 10. Of course, there may be more than one additional and/or alternative reactor unit module class object that represent reactors that are different from one another in physical makeup. Further, no attempt is made in FIG. 5 to illustrate all of the different types of units within a process plant that can be represented and/or modeled with a unit module class object 401. One of ordinary skill in the art will realize that there are many different types of units in different types of plants that may be modeled and/or represented with unit module class objects 401.

Similarly, there may be many different equipment module class objects 402 used to represent, model and/or configure any of a variety of equipment within the process plant 10. Examples illustrated in FIG. 5 include a totalizer equipment module class object 416 and an outlet valve equipment module class object 418. In the same manner, there may be a variety of control module class objects 404 such as those illustrated in FIG. 5. For example, an on/off valve control module class object 422, a level sensor control module class object 424, and a flow meter control module class object 426. Moreover, example display module class objects 406 illustrated in FIG. 5 include an alarm display module class object 432, a viewing display module class object 434 and a diagnostic display module class object 436. Of course, any other desired unit, equipment, control and display module class objects may be created and/or used within the example configuration application 50 according to the principles described herein.

Figure 5:
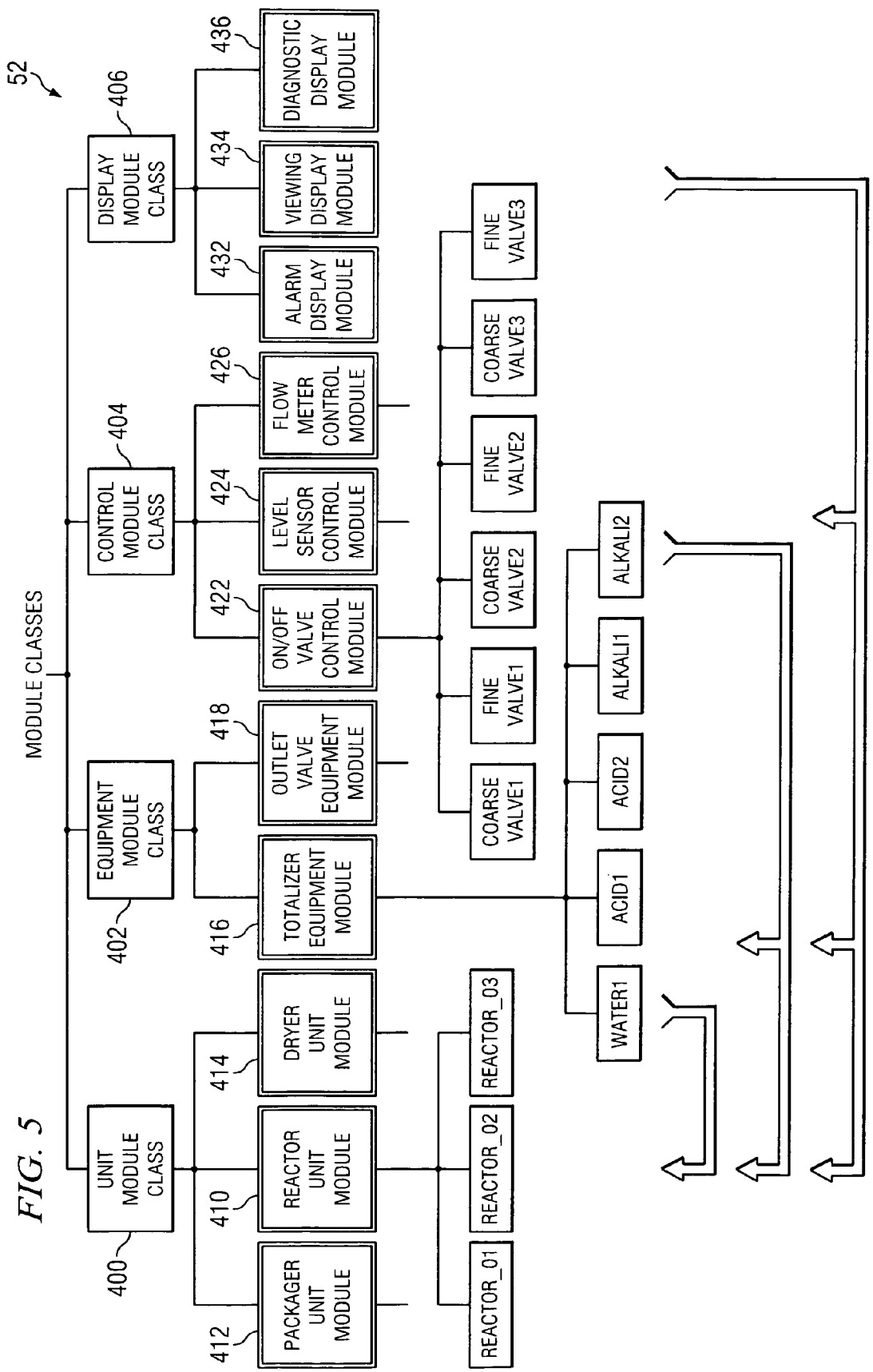
FIG. 5 is a block diagram illustrating example logical inter-relationships between module class objects and associated module objects.

As illustrated in FIG. 5, each module class object 52 may include and/or reference sub-objects associated therewith and/or owned thereby. Such sub-objects may also be module class objects 52 and/or, as illustrated in FIG. 5, may be module objects that are created as instances of the module class objects to which they belong. For example, as illustrated in FIG. 5, the example reactor unit module class object 410 has three (3) reactor module objects named REACTOR_01, REACTOR_02 and REACTOR_03 associated therewith, with these reactor module objects corresponding to (i.e., bound to) the respective example reactors REACTOR_01, REACTOR_02 and REACTOR_03 of FIG. 1. FIG. 5 also illustrates the example totalizer equipment module class object 416 as having and/or owning five (5) different module objects named WATER1, ACID1, ACID 2, ALKALI1 and ALKALI2. Likewise, the example on/off valve control module class object 422 of FIG. 5 includes module objects named COARSE_VALVE1, COARSE_VALVE2, COARSE_VALVE3, FINE_VALVE1, FINE_VALVE2 and FINE_VALVE3. In a similar manner, each of the other unit, equipment, control and display module class objects of FIG. 5 may have one or more module objects associated therewith. However, for the sake of simplicity, these module objects are not illustrated in FIG. 5.

In the illustrated example of FIG. 5, each of the REACTOR_01, REACTOR_02, and REACTOR_03 unit module objects, the ACID1, ACID2, ALKAL1, ALKALI2 and WATER1 totalizer (equipment) module objects, the COARSE_VALVE1, COARSE_VALVE2, COARSE_VALVE3, FINE_VALVE1, FINE_VALVE2 and FINE_VALVE3 control module objects and/or the other unit, equipment, control and display module objects are individual module objects tied to actual units, equipment, control modules and/or display applications within the process plant 10. For example, because there are multiple physical ACID totalizers used in the plant 10, there will be multiple ACID totalizer module objects created in the configuration routine, with a separate ACID totalizer module object existing for each of the individual acid totalizers that exists within the plant 10. However, each of the separate totalizer module objects is tied to and/or is owned by the same totalizer module class object 416. Of course, the example of FIG. 5 illustrates only a limited number of module class objects and associated module objects, and it will be readily understood by persons of ordinary skill in the art that other types of module class objects may be provided and/or that any desired number of module objects may be created from each of the different module class objects.

Each of the module class objects of FIG. 5 (and therefore each of the module objects of FIG. 5) may include, as part of the object, a definition and/or indication of the physical and/or logical process elements that define and/or make up the module and, if desired, the manner in which those process elements interact either physically and/or logically with one another to perform some activity within the process plant 10. For example, unit module class objects 401 will typically include an indication of all of the physical and control elements within and/or making up the process entity being defined as the unit. The unit module class object 401 may also define the particular makeup of the individual parts and/or how such parts are physically tied together to operate as a unit. Likewise, an equipment module class object 402 will typically include the control routines and/or control modules to be used to control the entity defined as the piece of equipment and/or commands that use the control routines and/or control modules to define the manner in which the parts interact either physically or logically, to operate as a piece of equipment when disposed within the plant 10. Similarly, each control module class object 404 will define a control activity, typically in the form of a control algorithm of some sort, to be performed within the plant. Also, each display module class object 406 may define, among other things, a display screen configuration and/or the information to be displayed, as well as the data to be collected and/or the data manipulations to be performed on collected data, if any, for specified types of units, equipment, areas of the plant, or any other physical or logical entity within the plant 10.

As part of a module class definition, a module class object 52 may indicate and/or define other module class objects 52 to be incorporated and/or used therein. When this is the case, the module objects created from such module class objects 52 will incorporate, refer to and/or include other module objects created from other module class objects 52 according to the relationships defined at the module class level. Although not strictly necessary, unit module class objects 401 may incorporate other unit module class objects 402, equipment module class objects 402, control module class objects 403 and/or display module class objects 404, while equipment module class objects 402 may incorporate other equipment module class objects 402, control module class objects 403 and/or display module class objects 404. Control module class objects 403 may incorporate and/or refer to other control module class objects 403 and display module class objects 404. However, if desired, other module class object interrelationships may be used as well. Example incorporation relationships are shown with the large arrows at the bottom of FIG. 5 and illustrate that any of the display module class objects 404 may be included in or referred to by any of the control, equipment and unit module class objects 401, 402, 403, that any of the control module class objects 403 may be included in or referred to by any of the equipment and the unit module class objects 401, 402 and that any of the equipment module class objects 402 may be included in or referred to by any of the unit module class objects 401. It will be understood that module class objects may incorporate other module class objects of the same type. For example, a unit module class object 401 may incorporate, as part of its definition, another unit module class object 401. In a similar manner, an equipment module class object 402 may include another equipment module class object 402, a control module class object 403 may include another control module class object 403 and a display module class object 404 may include another display module class object 404. Of course, if desired, a module class object 52 may use or incorporate another module class object 52 multiple times. For example, a reactor unit module class object 410 may incorporate and/or use the totalizer equipment module class object 416 numerous times because the reactors modeled by the reactor unit module class object 410 include multiple instances of totalizers.

It will also be understood that, when a first module class object 52 incorporates and/or uses a second module class object 52, any module object created from or as an instance of the first module class object 52 will incorporate and/or use a module object created from or as an instance of the second module class object 52. Thus, when a totalizer equipment module class object 416 incorporates and/or includes an outlet valve equipment module class object 418, a totalizer module object created from the totalizer equipment module class object 416, which will be uniquely named as, for example, TOTALIZER_1, will include a module object created from the outlet valve equipment module class object 418 and uniquely named, for example, OUTLET_VALVE_2. In this manner, the relationships between the module class objects 52 as defined at the module class object level are reflected in the module objects developed and/or created from these module class objects 52. This interconnection and/or referencing between module class objects 52 (and therefore module objects) enables great variability and/or high transferability of objects during configuration activities so that, after a set of primitive module class objects 52, such as control and equipment module class objects 402, 403, are created, more complex module class objects 52, such as unit module class objects 401, may be easily created by referencing the primitive module class objects 402, 403. Of course, while module class objects 52 can reference and/or use other module class objects, they can also and/or instead define and/or use simple objects and/or process entities, such as valves, sensors, etc. that have no associated module class object 52. These simple objects may be fully defined in terms of the control routines used within the module class object 52 itself.

Figure 6:
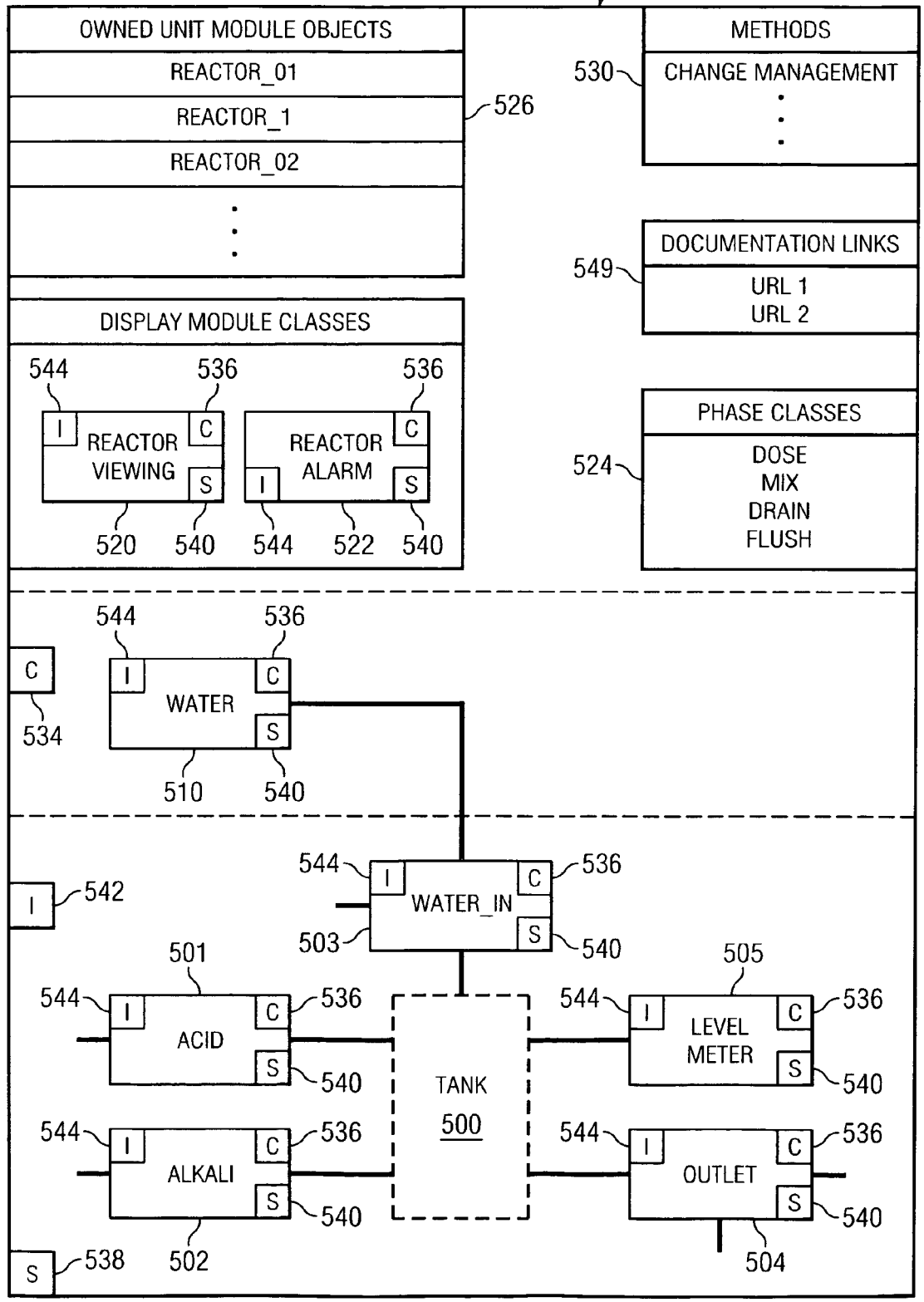
FIG. 6 illustrates an example reactor unit module class object that can be used to perform configuration activities for the example reactor of FIG. 2.

As described above, a module class object, in general, represents and/or defines the entities that make up and/or constitute the module class object. As such, when a module object is instantiated from a module class object, the module class object defines the relationships among the actual piece(s) of process equipment that form the instantiated process entity. FIG. 6 illustrates an example reactor unit module class object 410 that may be used to describe and/or define the entities associated with and/or present within a unit module class object. The example reactor unit module class object 410 of FIG. 4 includes an indication of a tank 500 that is a simple object and/or element within the process plant 10 for which no module class object exists. The example tank 500 is illustrated with dotted lines in FIG. 6 because there is no control and/or low-level activities need to control and/or perform input/output activities with respect to the tank 500. As a result, the example tank 500 is included merely to illustrate the interconnections between the other objects associated with the reactor unit module class object 410 of FIG. 6.

The example reactor unit module class object 410 of FIG. 6 also includes three (3) totalizers 501, 502 and 510 named ACID, ALKALI and WATER, respectively, which are three (3) different references to the totalizer equipment module class object 416 of FIG. 5. The example WATER totalizer module class object 510 of FIG. 6 is illustrated in a section of the unit module class object 410 that is separated by dotted lines to indicate that this is a shared module class object and, thus, that the unit module class object 410 has shared control over this object with other unit module class objects.

The example outlet object 504 of FIG. 6 is a reference to the outlet valve equipment module class object 418 of FIG. 5. Likewise, the example LEVEL sensor 505 is a reference to the level sensor control module class object 424 of FIG. 5 and the example WATER_IN valve 503 is a reference to a valve object that may be a simple valve element (and so fully defined within the unit module class object 410) and/or which may be a reference to a valve control module class object 52 defined elsewhere in the configuration strategy. The physical interconnections between the different entities and/or parts of the reactor unit module class object 410 are also illustrated in FIG. 6 for the sake of defining the interconnections between these different elements. As noted above, the unit module class object 410 and/or other module class objects of any type, can include simple elements that are fully defined within the module class object (including any generic control routines associated therewith) and/or can include references to module class objects defined exterior to the module class object.

The example unit module class object 410 of FIG. 6 also includes two example display module class objects 404 called a reactor viewing display 520 and a reactor alarm display 522 that are references to the viewing display module class object 434 and the alarm display module class object 432 of FIG. 5, respectively. These display objects 520, 522 define generic display activities for displaying the state (e.g., the fill level of the tank) and alarms associated with any of the equipment and/or parts of the reactor unit defined in the reactor unit module class object 410.

Similarly, the example unit module class object 410 of FIG. 6 includes other elements, such as phase class objects, illustrated in the box 524 as DOSE, MIX, DRAIN and FLUSH phase class objects, each of which defines a generic control routine to be operated on the unit defined by the unit module class object 410. Unit module class object 401 can have zero or more associations to phase class objects. The phase class objects 524 can be defined elsewhere and/or imported into the unit module class object 410 in any desired manner. The phase classes 524 are commands and/or routines that may be operated on a unit defined by the unit module class object 410 to perform different functions, such as filling the unit, heating the unit, emptying the unit, cleaning the unit, etc.

The example unit module class object 410 of FIG. 6 includes a memory and/or a section 526 that stores references to the module class objects that are created by the configuration application 50 (FIG. 1) from the unit module object 410. The section 526 is essentially a list of the module objects that were created from and/or that are owned by the unit module class object 410. Of course, this list and/or other indications of the owned module objects can be stored in the workstation and/or by the configuration application 50 in any desired manner and does not have to be physically contained in the unit module class object 410. In any event, in the example of FIG. 6, the unit module class object 410 owns module objects REACTOR_01, REACTOR_1, REACTOR_02, etc., each of which has been created from the example reactor unit module class object 410 of FIG. 6.

The example unit module class object 410 of FIG. 6 also includes a set of methods 530 that can be performed by the unit module class object 410 either during and/or after the configuration activities. The example methods 530 of FIG. 6 may include a change management method and/or application that automatically propagates changes made to the unit module class object 410 to each of the module objects 526 owned by the unit module class object 410. Other methods may include security control methods that perform security and/or access control with respect to the unit module class object 410 and/or with respect to any of the unit module objects 526 owned thereby and/or methods that enable a user and/or configuration engineer to specify change parameters and/or security parameters for the module class object and/or any module objects created therefrom. Of course, different methods 530 may perform any other procedure on or with respect to the unit module class object 410.

If desired, the example unit module class object 410 of FIG. 6 may control the manner in which changes made to the module class object 410 are propagated to the unit module objects 526 as well as the manner in which security access is set up in the unit module objects 526. One manner of providing this functionality is to set one or more flags and/or parameters within the unit module class object 410 to specify the manner in which changes are to be propagated to and/or security is to be handled in the unit module objects 526. In particular, one or more change propagation parameters may be set to specify whether or not changes made to the unit module class object 410 are to be automatically propagated to the one or more of the module class 526. These change propagation parameters may be stored in the unit module objects 526 and/or may specify for the entire unit module class object 410, or on a sub-element by sub-element basis, whether changes made to the unit module class object 410 are to be reflected in the associated unit module objects. For example, the unit module class object 410 of FIG. 6 includes a global change parameter 534 (marked "C") which may be set in each unit module object created from the unit module class object 410 to enable or disable changes made to the unit module class object 410 from being automatically reflected in the unit module object. Likewise, each sub-element and/or block, such as the blocks 501 505, 510, 520 and 522 may include a change parameter 536 specifying, for that block only, whether changes made to that block in the unit module class object 410 are to be reflected in the unit module object. Of course, the different blocks of a unit module object may be set differently so that, for example, changes made to the ACID block 501 of the unit module class object 410 will be propagated to the corresponding ACID block of a particular one of the module objects 526 but so that changes made to the ALKALI block 502 of the unit module class object 410 will not be propagated to the ALKALI block of the particular one of the unit module objects. Furthermore, the different unit module objects created from a unit module class object may have the change parameters set differently from one another so that changes to the ALKALI block 502 within the unit module class object 410 are propagated to the corresponding ALKALI block of a first one of the unit module objects 526 but not to the corresponding ALKALI block of a second one of the unit module objects 526. Of course, the change management method of the unit module class object 410 may access and/or use the change parameters of the unit module objects 526 to make or not make a change within those objects when the change is made in the unit module class object 410.

In a similar manner, the example unit module class object 410 of FIG. 6 may include one or more security parameters that specify the manner in which security and/or access is controlled in each of the unit module objects 526. The unit module class object 410 may include a global security parameter 538 (marked "S") that may provide any desired level of security to the entire reactor unit module object created from the reactor unit module class object 410 and/or may include a different security parameter 540 for each sub-element of the unit module class object 410, such as for each of the blocks 501 505, 510, 520, 522, etc. that specifies a level of security for each of those blocks on a block by block basis. The global security parameter 538 may be a locking parameter that locks the unit module class object to all users except those having a preauthorized security access level. Of course, the security parameters 538 and 540 may specify any one of a number of different levels of security, such as no access, limited access, access to particular types or identities of users, etc., and the security levels may be set to be different in the different blocks and in the different unit module objects created from the same unit module class object. If desired, part of the security measures may include providing encryption on one or more methods or algorithms associated with the unit module class object.

It will be understood that the change and/or security parameters 534, 538, etc. of the unit module class object 410 may be set to a default value, and that the corresponding change and security parameters of each of the unit module objects 526 created from the unit module class object 410 may take on this default value when created. However, the default change and/or security parameters 534, 538, etc. may also be individually changed (by a user with proper security access) in the unit module objects 526 after these unit module objects are created. While the change and security parameters 534, 538, etc. are discussed herein with respect to a reactor unit module class object, similar change and security parameters may be provided in other types of unit module class objects as well as in any desired types of equipment module class objects, control module class objects, display module class objects, etc.

If desired, the example unit module class object 410 of FIG. 6 may include references, such as URLs or other references, to documentation stored for and/or associated with the unit class module object 410, including documentation associated with the unit or any sub-elements of the unit associated with the unit module class object 410. Such references are illustrated in FIG. 6 as references 549.

The example unit module class object 410 of FIG. 6 includes a global IGNORE property 542 (marked "I" in FIG. 6) that indicates whether an instance of an entire reactor unit module object created from the example reactor unit module class object 410 may be identified as purposefully absent and, thus, is to be ignored. Likewise, each sub-element of the unit module class object 410, such as for each of the blocks 501 505, 510, 520, 522, etc. includes an IGNORE property 544 that indicates if an instance created from the sub-element may be configured as absent. Persons of ordinary skill in the art will readily appreciate that the example unit module class object 410 of FIG. 6 could, additionally or alternatively, define and/or use simple objects and/or process entities, such as valves, sensors, etc. that have no associated module class object 52. Such simple objects can also have an associated IGNORE property 544.

In the methods disclosed herein, the example IGNORE properties 542, 544 of FIG. 6 may be implemented as Boolean valued flags having a name of PERMIT_INSTANCES_2B_IGNORED and having a value of TRUE or FALSE (e.g., a logical "1" or "0"). The IGNORE property 542, 544 of a module class object from which a particular instance of module object, sub-object and/or simple object is created is used to determine if a configuration engineer is enabled and/or allowed to specify and/or configure whether or not the particular instance is physically absent.

For example, when the IGNORE property 542, 544 of a module class object for a particular module object, sub-object and/or simple object instance has a value of TRUE, the corresponding module object, sub-object and/or simple object may be configured, as determined by the configuration engineer, as absent. It will be understood that the example IGNORE properties 542, 544 of the example unit module class object 410 of FIG. 6 may have a default value (e.g., FALSE).

In general, the IGNORE property 544 of a particular sub-object 501, 502, 503, 504, 505, 510 takes the value of the associated module class object. For example, when the example unit module class object 410 of FIG. 6 is created and/or defined to include a totalizer module object ACID 501, the IGNORE property 544 of ACID 501 is set based on that IGNORE property 542 of the totalizer module class object 416. However, any variety of rules and/or schemes may be used to set initial IGNORE properties 544, such as setting them equal to the IGNORE property 542 of the unit module class object that refers to module class object. Any variety of interface(s) may also be used to set the individual IGNORE properties 542, 544. For example, an interface for setting the IGNORE property 544 for a FINE_VALVE of a totalizer equipment module class object (e.g., the example module class object 416 of FIG. 7) is discussed below in connection with FIG. 9.

When an instance of a module object, sub-object and/or simple object is specified and/or configured by a configuration engineer as absent (as enabled by an IGNORE property of an associated module class object), a parameter of the instantiated module object, sub-object and/or simple object (not shown) is set to indicate that the module object, sub-object and/or simple object is absent. An example parameter is a Boolean valued flag having a name of _IGNORE and having a value of TRUE or FALSE (e.g., a logical "1" or "0"). In the illustrated examples described herein, the parameter has a default value of FALSE, indicating that the module object, sub-object and/or simple object is present. Alternatively, by default the parameter is left undefined and, thus, assumed to have a value of FALSE. An example interface for specifying and/or configuring that an instance of a module object, sub-object and/or simple object is discussed below in connection with FIG. 10.

Figure 7:
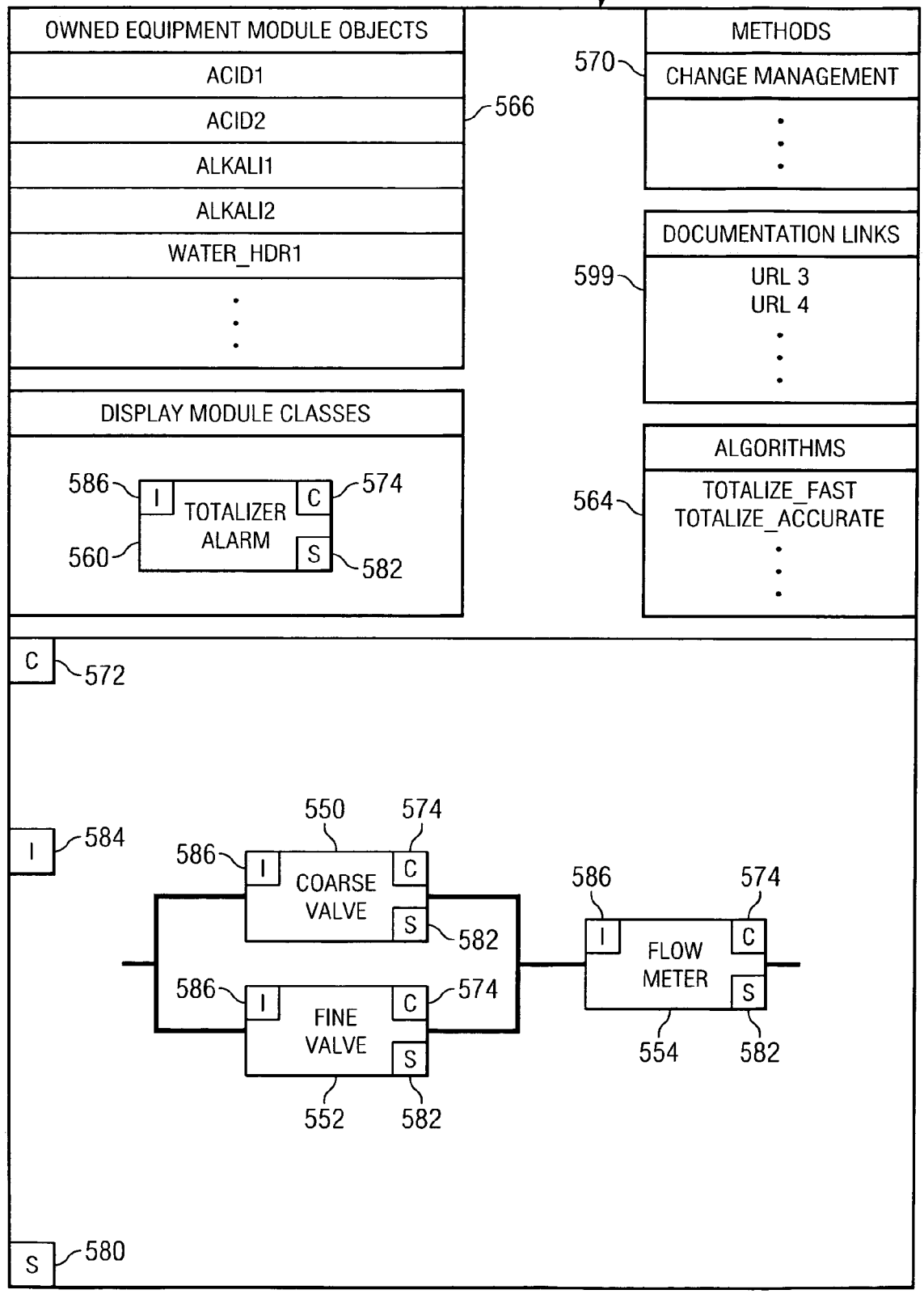
FIG. 7 illustrates an example totalizer equipment module class object that can be used to perform configuration activities for the example totalizers of FIGS. 2 and/or 3.

FIG. 7 illustrates an example totalizer equipment module class object 416 that may be used to describe and/or define the entities associated with and/or present within an equipment module class object. The example totalizer module class object 416 of FIG. 7 illustrates a module class object that can represent any or all of the example totalizers 101, 102, 110, 101M of FIGS. 2 and 3. Persons of ordinary skill in the art will readily recognize that the structure and/or manner of representation illustrated in the example of FIG. 7 is similar in content and/or structure to the example of FIG. 6, and differ principally in their scope. As such, persons of ordinary skill in the art will readily understand the illustrated example of FIG. 7 in light of the discussion of FIG. 6 presented above.

In more detail, the example totalizer equipment module class object 416 of FIG. 7 includes control module class objects named COARSE_VALVE 550 and FINE_VALVE 552, a control module class object named FLOW_METER 554 (which is a flow meter control module class object), and an illustration of the interconnects between these elements. The example COARSE_VALVE 550 and the example FINE_VALVE 552 of FIG. 7 represent on/off type control module class objects. The example FLOW_METER 554 of FIG. 7 represents a flow meter control module class object.

Still further, the example totalizer equipment module class object 416 of FIG. 7 includes example references to display module class objects, including to a Totalizer Alarm display module class object 560, and to one or more algorithms 564 that may be implemented on the example equipment module class object 416. While the example algorithms 564 of FIG. 7 are listed as including an example TOTALIZE_FAST command and an example TOTALIZE_ACCURATE command, any other commands and/or algorithms may be included and/or used as well. The example command algorithms 564 of FIG. 7 associated with and/or included in the example equipment module class object 564 may take any desired form, such as, for example, command-driven algorithms (CDAs), state-driven algorithms (SDAs), sequential flow chart (SFC) algorithms, function block diagram (FBD) algorithms, phase algorithms, etc. However, generally speaking, all of the example algorithms 564 will be of a particular type, such as CDAs or SDAs. Of course, the algorithms 564 may be written in any desired language and/or programming environment such as the C or C++ programming environments, any sequential function chart programming environment, a function block programming environment, etc.

The example totalizer equipment module class object 416 of FIG. 7 also includes any of a variety of lists and/or memories that stores indications (and, if necessary, communication paths to) a set of owned equipment module objects 566 named ACID1, ACID2, ALKALI1, ALKALI2, WATER_HDR1, etc. created from the example equipment module class object 416. The totalizer equipment module class object 416 likewise includes a set of methods 570 including a change management method that can be used in conjunction with the global change parameter 572 and/or the object-based change parameters 574 to control the propagation of changes to the equipment module objects 566. The totalizer equipment module class object 416 also includes a global security parameter 580 as well as object-based security parameters 582. The change and security parameters 572, 574, 580 and 582 operate substantially as described above in connection with the example change and security parameters of the unit module class object 410 of FIG. 6 and may apply to any of the elements of the equipment module class object 416, including the commands 564. In the interest of brevity, interested readers are referred to the discussion of change and/or security parameters presented above in connection with FIG. 6 for additional details.

Similar to the example of FIG. 6, the example equipment module class object 416 of FIG. 7 includes a global IGNORE property 584 (marked "I" in FIG. 7) that indicates whether an instance of a totalizer module object created from the example totalizer equipment module class object 416 may be identified as purposefully absent and, thus, is to be ignored. Likewise, each sub-element of the unit module class object 416, such as for each of the blocks 550 552, 560 includes an IGNORE property 586 that indicates if an instance created from the sub-element may be configured as absent. Persons of ordinary skill in the art will readily appreciate that the example equipment module class object 416 of FIG. 7 could, additionally or alternatively, define and/or use simple objects and/or process entities, such as valves, sensors, etc. that have no associated module class object 52. Such simple objects can also have an associated IGNORE property 586. The usage, setting and/or application of the IGNORE properties 584, 586 are substantially similar to that presented above in connection with FIG. 6 and, thus, an interested reader is referred to the discussion of FIG. 6 for additional details regarding the IGNORE properties 584, 586. An example interface for setting the IGNORE property 586 for the FINE_VALVE 552 of the example totalizer equipment module class object 416 is discussed below in connection with FIG. 9.

When an instance of an equipment module object, sub-object and/or simple object is specified and/or configured by a configuration engineer as absent (as enabled by an IGNORE property of an associated equipment module class object), a parameter of the instantiated equipment module object, sub-object and/or simple object (not shown) is set to indicate that the equipment module object, sub-object and/or simple object is absent. An example parameter is a Boolean valued flag having a name of _IGNORE and having a value of TRUE or FALSE (e.g., a logical "1" or "0"). In the illustrated examples discussed herein, the parameter has a default value of FALSE indicating that the module object, sub-object and/or simple object is present. Alternatively, by default the _IGNORE parameter is undefined and, thus, assumed to have a value of FALSE. An example interface for specifying and/or configuring that an instance of a module object, sub-object and/or simple object is discussed below in connection with FIG. 10.

If desired, the example equipment module class object 416 of FIG. 7 may include references 599, such as URLs and/or other references, to documentation stored for and/or associated with the equipment module class object, including documentation associated with the equipment or any sub-elements of the equipment associated with the equipment module class object 416. Likewise, any of the algorithms of the example equipment module class object 416, such as any of the example algorithms 564, may be encrypted and/or have a security parameter associated therewith that encrypts and/or de-encrypts these algorithms 564. Such encryption and/or de-encryption may be performed by one of the methods 570 if so desired.

Returning to FIG. 1, to configure the example process plant 10, a configuration engineer creates the unit, equipment, control and display module class objects, as necessary, within the library associated with the configuration application 50. In some examples, the configuration engineer starts with creating lower scope entities, such as the control and/or display module classes, and then develops module class objects for the higher scope entities, such as the equipment and/or the unit module class objects that may use and/or refer to the lower scope entities. Thereafter, the configuration engineer can select and/or specify the module class objects as necessary to create actual module objects corresponding to the selected module class objects for each of the process entities within the plant. When configuring replicated equipment, the configuration engineer will create a module object for each instance of the replicated equipment from the same module class object. Thus, the configuration engineer may create a reactor unit module class object that represents the example reactors of FIG. 1, possibly including the creation of other module class objects referenced by the reactor unit module class object if such other module class objects do not already exist within the library. Thereafter, the configuration engineer may configure the process by creating a reactor unit module object for each of the example reactors REACTOR_01, REACTOR_02 and REACTOR_03 of FIG. 1 from the reactor unit module class object.

After creating one or more module objects from a module class object, the configuration engineer may bind the created module objects (including the sub-objects and/or referenced objects) to the specific equipment of the process plant 10. Because the unit module objects are associated with a single unit module class object, the alias names, parameters, and other variables for the different unit module objects can be specified together using, for example, a bulk processing application such as a spreadsheet application. Of course, by binding the module objects to particular equipment, the configuration engineer is actually specifying the control variables and communication path names used by control routines and/or control modules within the controllers 12A-C to perform control activities during operation of the process plant 10 and/or display variables used by display routines in, for example, the workstations 14A-C, during operation of the process plant 10. Once binding activities are completed, the configuration engineer may then download the bound control routines to the example controllers 12A-C and the bound display routines to the example workstations 14A-C.

The creation of module class objects, the instantiation of module objects, sub-objects and/or referenced objects may be performed using any of a variety of application(s), user interface(s), screen(s), method(s) and/or process(es). Example module class objects, configuration systems and/or methods are described in U.S. Pat. No. 7,043,311, which is hereby incorporated by reference in its entirety.

FIGS. 8, 9, 10, 11, 12 and 13 depict screen displays, user interfaces, dialog boxes and/or windows that may be created by, for example, the example configuration application 50 of FIG. 1 during the process of a configuration engineer creating, configuring and/or using module class objects to configure the example process plant 10. While example configuration screens, user interfaces, dialog boxes and/or windows are illustrated in FIGS. 8-13, persons of ordinary skill in the art will readily recognize that any of a variety of configuration view(s), screen(s), interface(s), dialog box(es) and/or window(s) may be presented and/or used to configure and/or depict module class object and/or module objects. As such, the examples of FIGS. 8-13 are merely illustrative examples.

Figure 8:
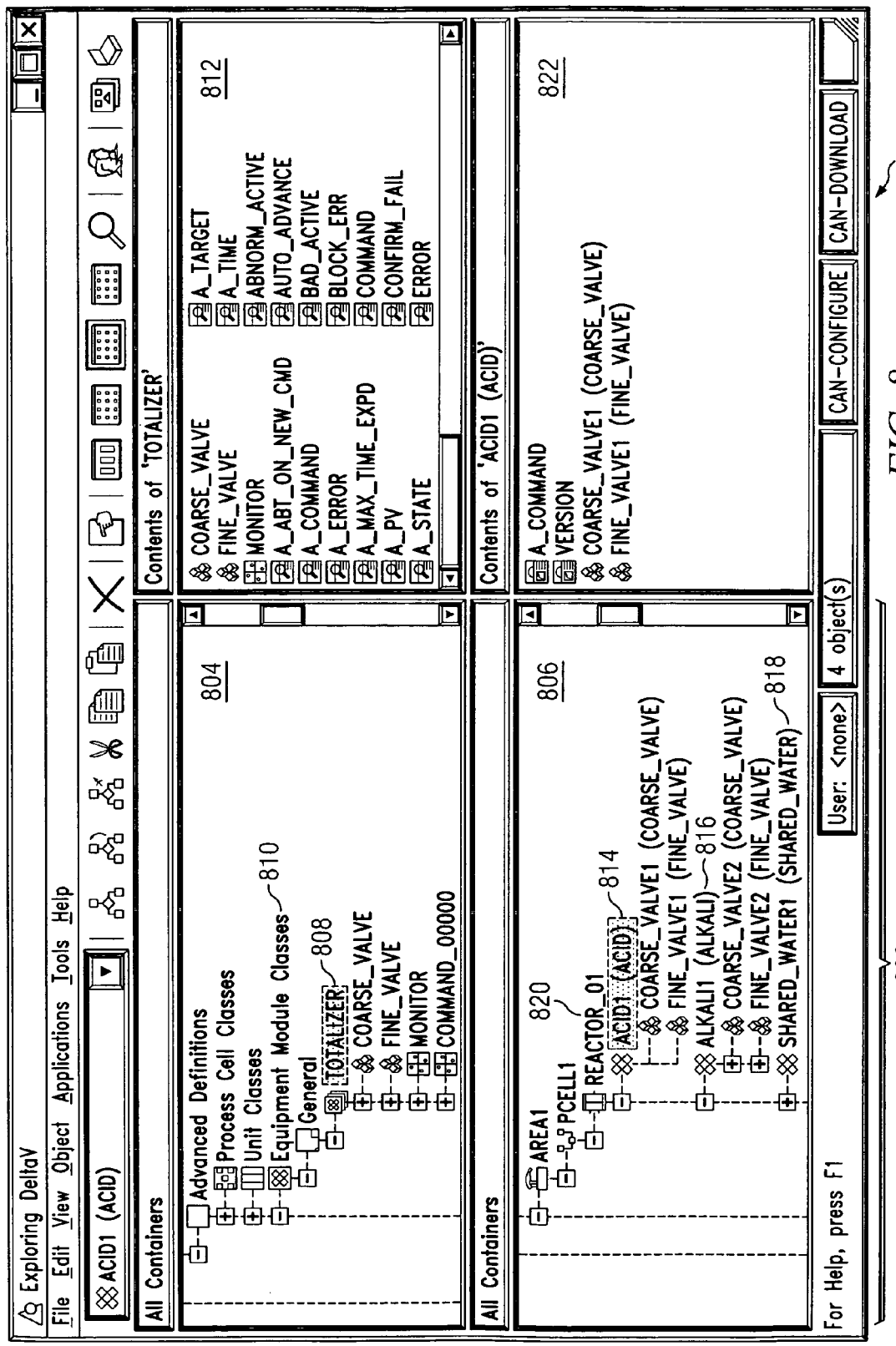
FIG. 8 illustrates an example first configuration screen that may be used to view a configuration of a process plant.
Figure 11:
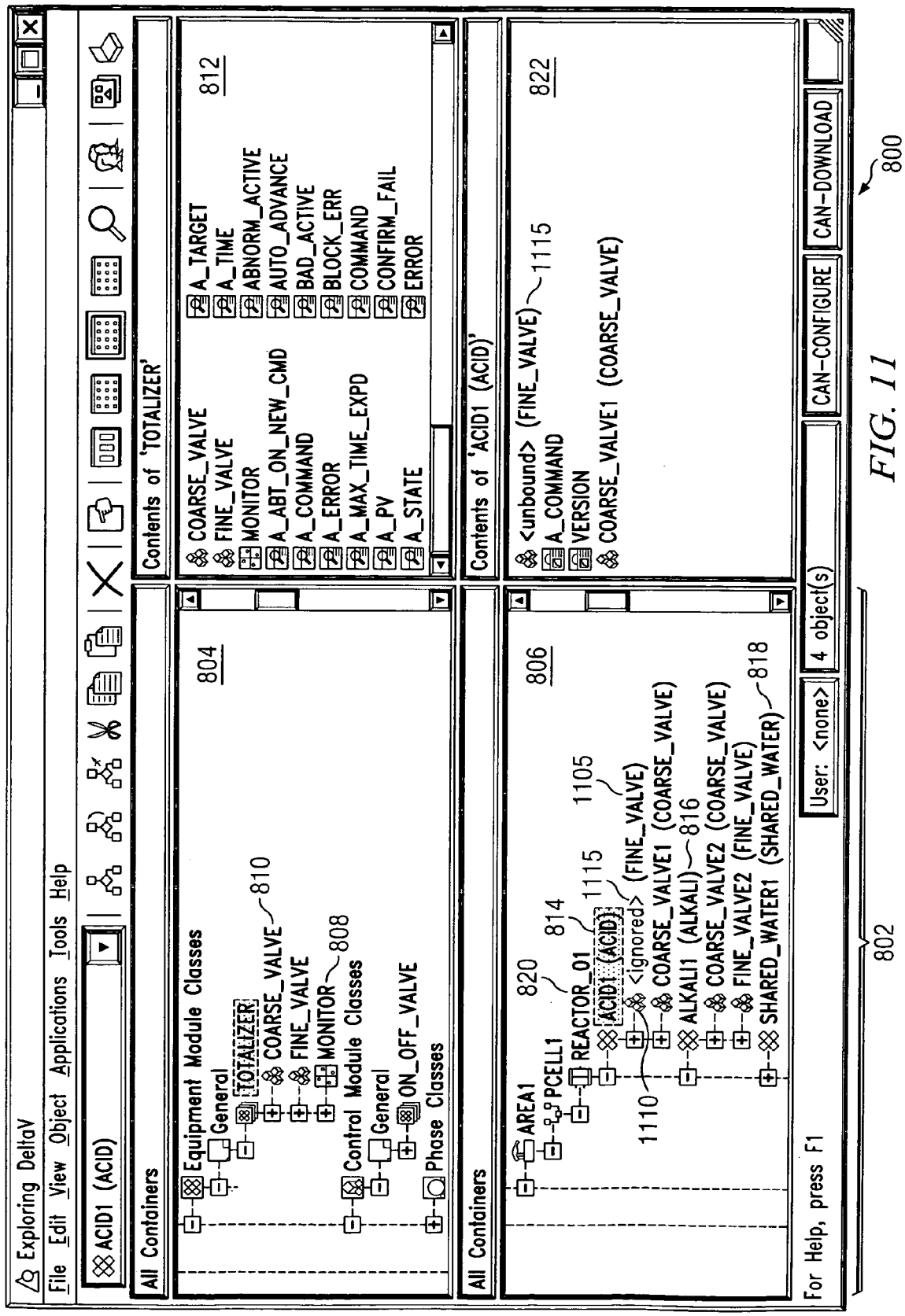
FIG. 11 illustrates the example first configuration screen of FIG. 8 after an example FINE_VALVE object is identified as absent.
Figure 12:
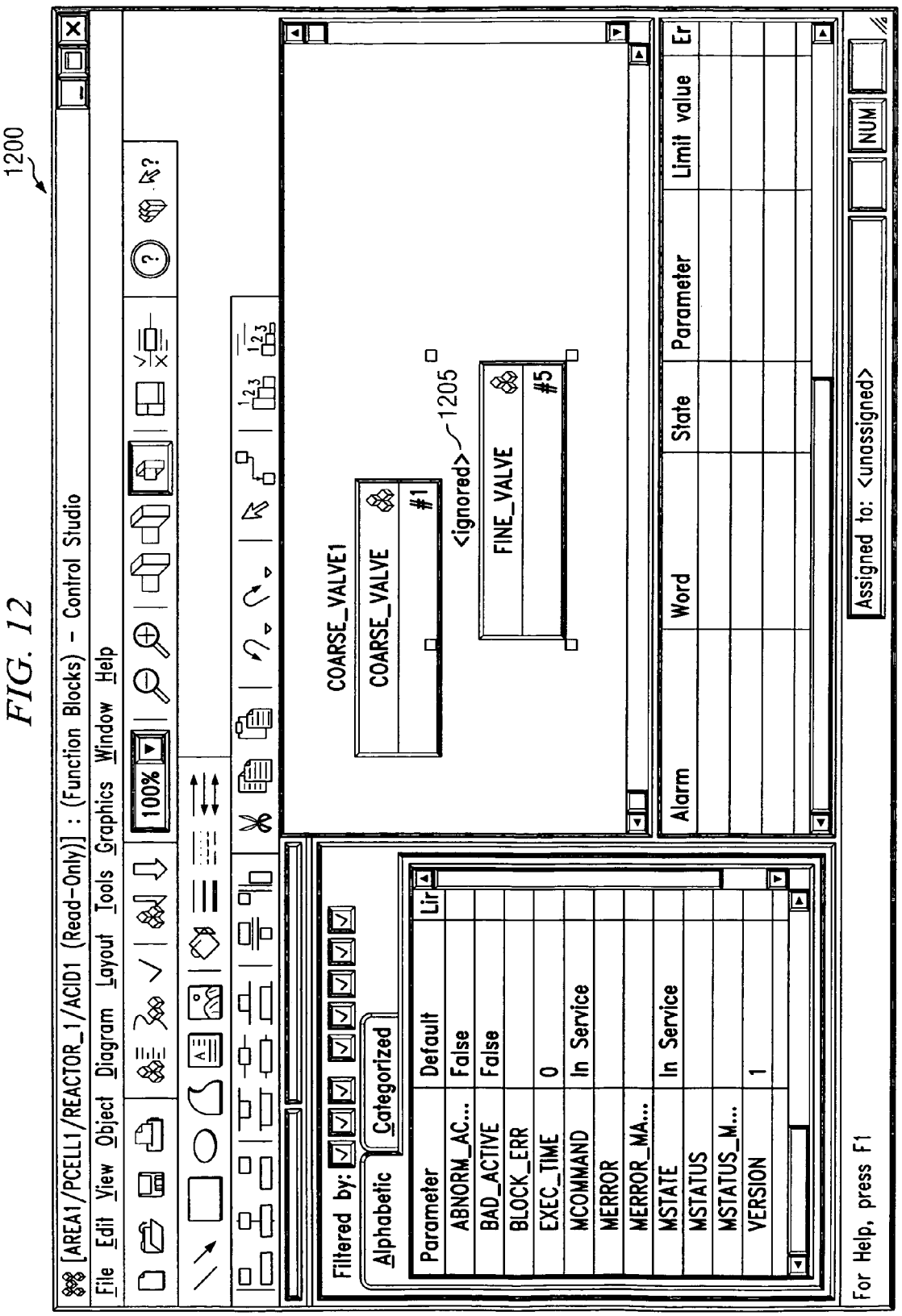
FIG. 12 illustrates an example second configuration screen that illustrates example parameters of an example totalizer module object that includes an absent FINE_VALVE.

In general, as will be readily understood by persons of ordinary skill in the art, the illustrated examples of FIGS. 8, 11 and 12 include an explorer view on the left-hand side of the screen and/or user interface that provides an organizational tree structure depicting a portion of an example configuration of the process plant 10. Likewise, most of the examples of FIGS. 8, 11 and 12 include one or more information views on the right-hand side that provide further information about selected ones of the elements in the left-hand explorer view. The information that is able to be displayed to a user and/or changed by a user in the information views may be determined and/or controlled by the example control and/or security parameters 534, 536, 538, 540, 572, 574, 580 and/or 582, and/or the example IGNORE properties 542, 544, 584 and/or 586 of FIGS. 6 and/or 7 set for each of the different module class objects and/or sub-elements thereof. Thus, a particular element within the explorer view may be displayable and/or exposed to a user for viewing and/or changing based on the security and control parameters, and/or IGNORE properties set in the module class object(s) and propagated to the module objects depicted in the explorer view. Of course, as explained earlier, certain information may be hidden at all times, may be displayable and/or changeable only by a user entering a password and/or other security code, may be displayable at all times and not changeable, may be displayable and changeable at all times or any other combination of these or other security and change parameters and/or IGNORE properties. Still further, if desired, the displayability and/or changability of an element may be indicated in the explorer view using highlighting, graying out, color or any other technique to inform the user which elements can be displayed in more detail and/or changed.

In some examples, a graphical user interface (GUI) is used and/or useful to represent, visualize and/or construct a control structure for a process plant using module class objects and/or module objects. Such interfaces provide, in some examples, an explorer view and/or window that allows a configuration engineer to construct a representation of and/or configure a process plant. To provide an explorer view, the example screen 800 of FIG. 8 includes a portion 802 depicted on the left-hand side of the display 800. The example explorer portion 802 of FIG. 8 includes an upper portion 804 that depicts a list of module classes and a lower portion 806 that depicts a list of module objects. In the example of FIG. 8, the module class and the module objects are depicted in the explorer view 802 in a hierarchical fashion. For example, an example totalizer equipment module class 808 (e.g., corresponding to the example totalizer equipment module class object 416 of FIG. 7) belongs to a library 810 of equipment module classes. As illustrated, the example totalizer module class 808 includes indications and/or references to numerous sub-elements including a COARSE_VALVE, a FINE_VALVE, a MONITOR, etc. Because the example totalizer class object 808 is selected in the example screen 800, the elements of the totalizer class object 808 are depicted in more detail in the upper right-hand side 812 of the screen 800.

Likewise, example totalizer module objects 814, 816 and 818 are referenced by an example reactor module object 820 (e.g., corresponding to the example REACTOR_01 of FIG. 1). Because the example ACID1 totalizer module object 814 of FIG. 8 (e.g., corresponding to the example totalizer 101 of FIG. 2) is selected in the example screen 800, the elements of the ACID1 totalizer module object 814 are depicted in more detail in the lower right-hand side 822 of the screen 800.

Figure 9:
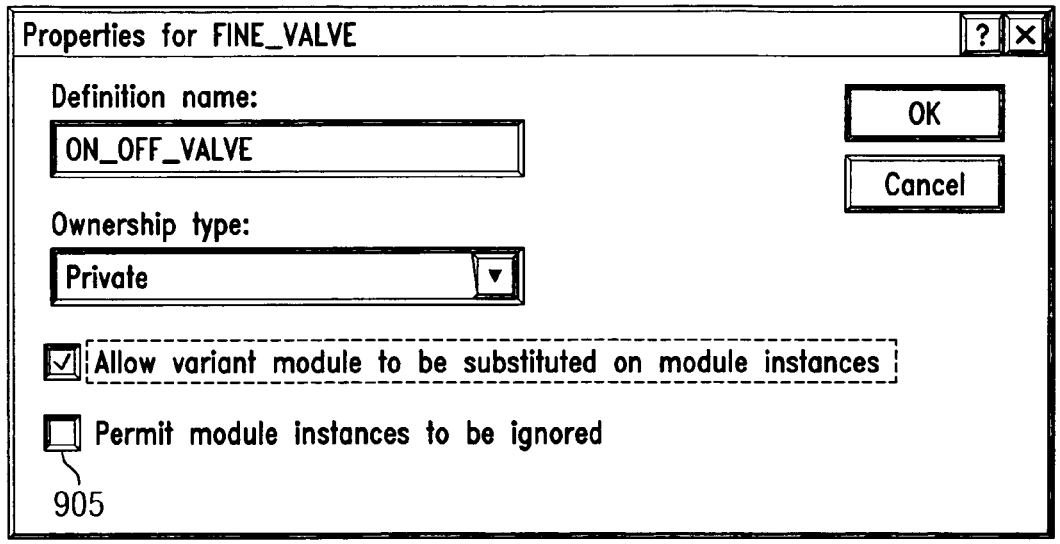
FIG. 9 illustrates an example first dialog box that may be used to enable equipment to be identified as absent.

In many GUIs, dialog boxes are employed to provide a consistent and/or readily understood method to configure one or more parameters and/or options. For example, dialog boxes may be used to select and/or set properties and/or parameters of module class objects and/or module class instances. FIG. 9 illustrates an example dialog box for setting one or more properties of a module class object (e.g., the properties for a FINE_VALVE control module class object). Such a FINE_VALVE control module class object may be used as part of a TOTALIZER equipment module class object (e.g., the example module class object 416 of FIGS. 5 and/or 7). Persons of ordinary skill in the art will readily recognize that one or more similar and/or different dialog boxes may be used to set the properties and/or parameters of a module class object. Further, configuration dialog boxes may include any number and/or type of check box(es), selection list(s), text box(es), etc. for setting any of a variety of properties and/or parameters of a module class object. In general, the type and/or number of dialog box(es), dialog box element(s) and/or the type and/or number of properties and/or parameters that may be selected and/or set will be specific to particular module class objects.

To enable a configuration engineer to identify and/or configure particular module object instances created from the FINE_VALVE control module class object as absent, the example dialog box of FIG. 9 includes a check box 905. The example check box 905 of FIG. 9 is selected and/or deselected to set the corresponding IGNORE property of the FINE_VALVE control module class object. If the check box 905 is selected (e.g., displays a check mark) the PERMIT_INSTANCES_2B_IGNORED property is set to TRUE. Otherwise, the PERMIT_INSTANCES_2B_IGNORED property is set to FALSE and/or left undefined. If the PERMIT_INSTANCES_2B_IGNORED property is left undefined, it will be subsequently assumed to be FALSE.

Figure 10:
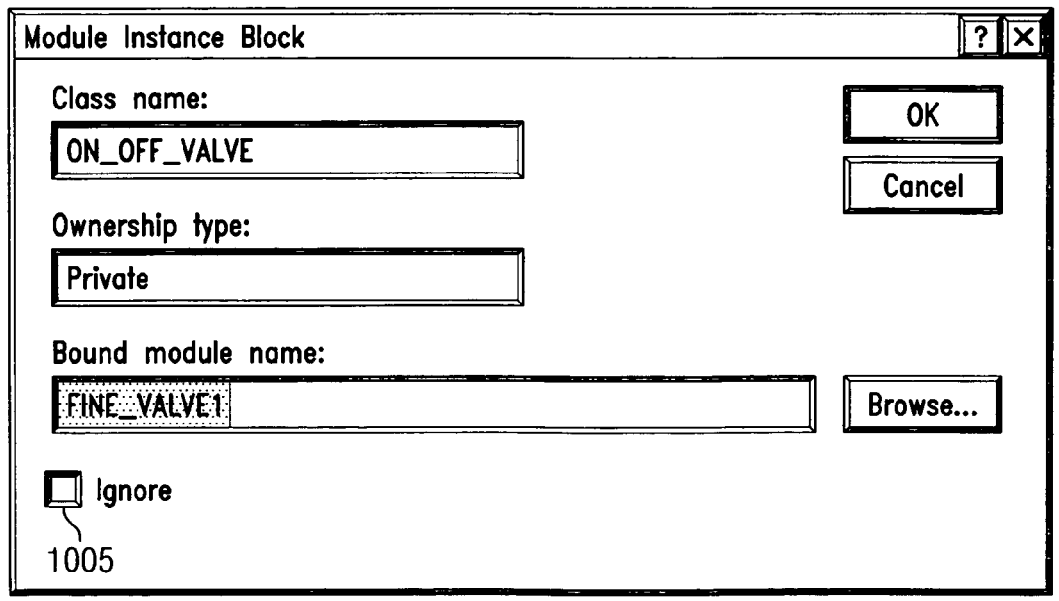
FIG. 10 illustrates an example second dialog box that may be used to identify absent equipment.

FIG. 10 illustrates an example dialog box for setting one or more parameters of a module object (e.g., a FINE_VALVE of a particular totalizer module object). Persons of ordinary skill in the art will readily recognize that one or more similar and/or different dialog boxes may be used to set the properties and/or parameters of a module object. Moreover configuration dialog boxes may include any number and/or type of check box(es), selection list(s), text box(es), etc. for setting any of a variety of properties and/or parameters of a module object. In general, the type and/or number of dialog box elements and/or the type and/or number of properties and/or parameters that may be selected and/or set will be specific to particular module objects. Additionally or alternatively, whether or not a particular object module is absent may be configured via a bulk-editing method, tool and/or application (e.g., a spreadsheet) that is used to bind and/or associate object modules with actual equipment of a process plant.

To allow a configuration engineer to identify and/or configure whether or not the particular object module is absent, the example dialog box of FIG. 10 includes a check box 1005. The example check box 1005 of FIG. 10 is selected and/or deselected to set the corresponding _IGNORE parameter of the FINE_VALVE control module object. If the check box 1005 is selected (e.g., displays a check mark) the _IGNORE parameter is set to TRUE. Otherwise, the _IGNORE parameter is set to FALSE and/or left undefined. If the _IGNORE parameter is left undefined, it will be subsequently assumed to be FALSE.

The example check box 1005 of FIG. 10 is only active if the PERMIT_INSTANCES_2B_IGNORED property of the associated module class object is set to TRUE. If the PERMIT_INSTANCES_2B_IGNORED property of the associate module class object is FALSE and/or undefined, the check box 1005 is inactive (e.g., "grayed out") such that a configuration engineer can not select and/or deselect the check box 1005 to set a corresponding _IGNORE parameter.

FIG. 11 illustrates the example configuration screen of FIG. 8 once the FINE_VALVE module object 1105 of the ACID1 totalizer module object 814 is marked, configured and/or identified by a configuration engineer as absent. For example, the configuration engineer could use the example dialog box of FIG. 9 to enable FINE_VALVEs of TOTALIZER module objects to be configured and/or identified as absent. If the configuration engineer is enabled to identify any particular FINE_VALVE of a totalizer module object (e.g., the example object 1105 of FIG. 11) as absent, the configuration engineer can then, for example, use the example check box 1005 of FIG. 10 to identify the FINE_VALVE module object 1105 as absent.

As illustrated in FIG. 11, because the FINE_VALVE module object 1105 was identified, configured and/or marked as absent, the FINE_VALVE module object 1105 is depicted as absent. In the illustrated example, the graphic 1110 to the left of the name of the module object 1105 is modified (e.g., stippled out) and "<ignored>" 1115 appears before the name. Likewise in the portion 822 of the screen 800 providing additional data, detail and/or information related to the ACID1 module object 814, the FINE_VALVE is identified as unbound as illustrated in FIG. 11.

FIG. 12 is an example screen 1200 illustrating an alternative view and/or representation of the example ACID1 module object 814 of FIG. 11. The example screen 1200 of FIG. 12 may be used to, for example, set any of a variety of parameters and/or control aspects for the example ACID1 module object 814. Because, the FINE_VALVE module object 1105 was identified and/or configured as absent by a control engineer, FINE_VALVE is depicted as absent as illustrated with "<ignored>" 1205 in FIG. 12. Accordingly, a control engineer is not enable to bind the FINE_VALVE to a particular physical valve and/to set parameters for FINE_VALVE.

Figures 13, 14:
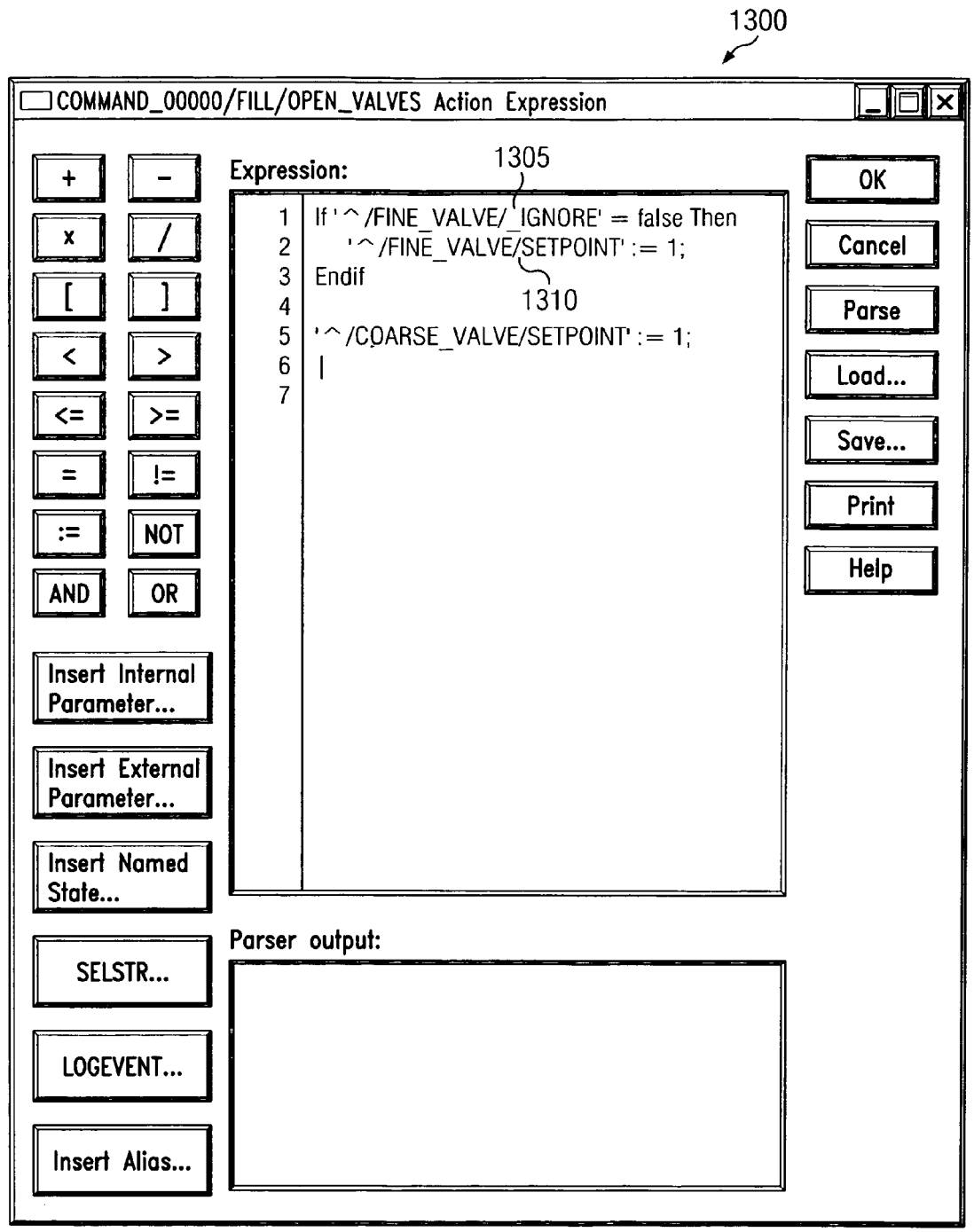
FIG. 13 illustrates an example third configuration screen that may be used to configure and/or view a control routine associated with absent equipment.
FIG. 14 illustrates an example portion of an example controller download script.

In some examples, control routines are written and/or represented using a text-based scripting and/or programming language. In such examples, a tool that facilitates the creation and/or modification of control routines may be employed by a control and/or configuration engineer. FIG. 13 illustrates another example screen display 1300 (e.g., a pop-up window 1300) that may be used to display and/or create the details of a control routine and/or a step of control routine of, for example, the example totalizer equipment module class object 416 of FIG. 7. In the illustrated example, the _IGNORE parameter of a FINE_VALVE module object 1305 is tested and/or used to control the flow and/or execution of the control routine. When the example control routine illustrated in FIG. 13 is executed and/or carried out for a particular totalizer equipment module object (e.g., the example totalizer 101 of FIG. 2), the referenced_IGNORE parameter is resolved to the _IGNORE parameter for the FINE_VALVE of a particular totalizer equipment module object being controlled. As such, the example control routine of FIG. 13 can be utilized for totalizer module objects whether or not their associated FINE_VALVE is present. In this way, control routines for the totalizer equipment module class object 614 can be written and/or constructed to accommodate module objects having absent equipment (i.e., variants of totalizer module objects)

In the example of FIG. 13, the parameter FINE_VALVE/ SETPOINT 1310 is only set if the FINE_VALVE is not absent (e.g., the value of FINE_VALVE/_IGNORE is not TRUE). Thus, as illustrated in FIG. 13, the _IGNORE parameter can be tested such that code for absent equipment is not executed. Accordingly, when the example routine of FIG. 13 is actually executed and/or carried out, error messages and/or flags potentially caused by executing and/or carrying out code for absent equipment may be suppressed or otherwise not generated and/or presented to system operators and/or users.

Persons of ordinary skill in the art will readily recognize that _IGNORE parameters may be used in any of a variety of code statements, combinations and/or with any of a variety of additional conditional statements. For example, the _IGNORE parameter of the COARSE_VALVE could also have been checked.

It will be readily understood by persons of ordinary skill in the art that, in any of a variety of similar manners, a configuration engineer may enable equipment to be configured as absent, configure particular equipment as absent and/or use any other unit module class objects, equipment module class objects and control module class objects as well as display module class objects to create configuration elements for units, equipment, control elements and display elements within the process control environment according to the principles described herein. It will also be understood that module class objects, which can be quite detailed in nature, provide the configuration engineer with great advantages in creating a configuration because the engineer does not have to create each individual control element separately or copy each individual control element separately from a control template but, instead, can use module class objects which are provided at higher and higher levels or scopes to create larger and larger bulk configuration items for use in configuring the process plant 10. Additionally, by being able to purposefully configure particular module objects and/or particular portions of module objects as absent, a configuration engineer has additional flexibility and/or ability to reuse module class objects across an increasingly large number, scope and/or variety of replicated equipment.

The configuration engineer can also make changes to the elements of a configuration of different process entities on a global basis by changing one or more of the unit module class objects and having those changes propagated to each of the module objects created from and associated with those unit module class objects. This feature makes changes within the configuration easier and/or less time consuming to make after a configuration has already been created. Moreover, the configuration engineer may specify an access level to different elements or components of module objects within the configuration system by setting security parameters within the module class objects. As noted above, the configuration engineer may specify a security on a module by module basis at any level, such as at the unit module level, the equipment module level, the control module level and the display module level. In this manner, some elements of a unit module object may be viewable while others may not be viewable. Further still, through the flexibility to purposeful configuration and/or identification of absent equipment, a configuration engineer can apply configuration changes on an ever broader basis. For example, a configuration engineer can define a module class object that incorporates multiple variants of absent equipment. Accordingly, when changes are made to the module class object the changes can be automatically propagated and/or applied to all module objects created from the module class object including module objects with equipment purposefully configured as absent.

Of course, once configuration of the system is complete and the module objects are bound to the individual process entities within the process plant 10, the control and display modules or elements associated with these modules may be provided to the proper controllers 12A-C and workstations 14A-C of FIG. 1 for execution during operation of the process plant 10. The control and/or display modules or elements may be provided via any variety of means such as, but not limited to, downloading them to a controller, using a download script, having them retrieved by a controller, having them retrieved using a download script, writing them into a memory of a controller, etc.

In some example process plants, scripts are used to facilitate the download of numerous control routines and/or configuration data for multiple process entities to one or more controllers. For example, download scripts can define and/or organize what routines and/or data to be downloaded to, downloaded by, provided and/or acquired. FIG. 14 illustrates an example clause (e.g., line) of a download script that is used to download control routines and/or configuration data and/or parameters to, for example, any of the example controllers 12A-C of FIG. 1. Any number of clauses for any number and/or variety of objects and/or module objects may be used to form a download script. In an example download script, each line of the script is structured as illustrated in FIG. 14, where each line corresponds to a particular object and/or module object.

To identify the module object to which the download clause refers, the example download script clause of FIG. 14 includes an identifier field 1405 that identifies a particular type of module object. In the example of FIG. 14, the identifier field 1405 identifies a FINE_VALVE.

In this example, the referenced FINE_VALVE was configured as purposefully absent and, thus, the example download script clause of FIG. 14 includes an ignore field 1410. The example ignore field 1410 of FIG. 14 is a Boolean field labeled "IGN." The module object referenced by the identifier field 1405 is absent and the example IGN field 1410 has a value of "T" for TRUE. If the referenced module object is not absent, the example IGN field 1410 could have a value of "F" for FALSE. Alternatively, the IGN field 1410 could be omitted and a receiving controller 12A-C may assume that the equipment is supposed to be present.

A controller (e.g., one of the example controllers 12A-C) receiving control routines and/or configuration data and/or parameters via the example download script of FIG. 14 can use the value of the IGN field 1410 to determine is equipment is configured as absent. As such, the controller can ignore the status of absent equipment, thereby not initiating error messages and/or alerts due to unbound, missing and/or unconfigured equipment.

While an example download script clause is illustrated in FIG. 14, persons of ordinary skill in the art will readily recognize that download scripts and/or download script clauses may be constructed using any of a variety of alternative and/or additional fields. Moreover, the fields illustrated in FIG. 14 may be combined, split, divided, re-arranged in any of a variety of ways.

Figure 15:
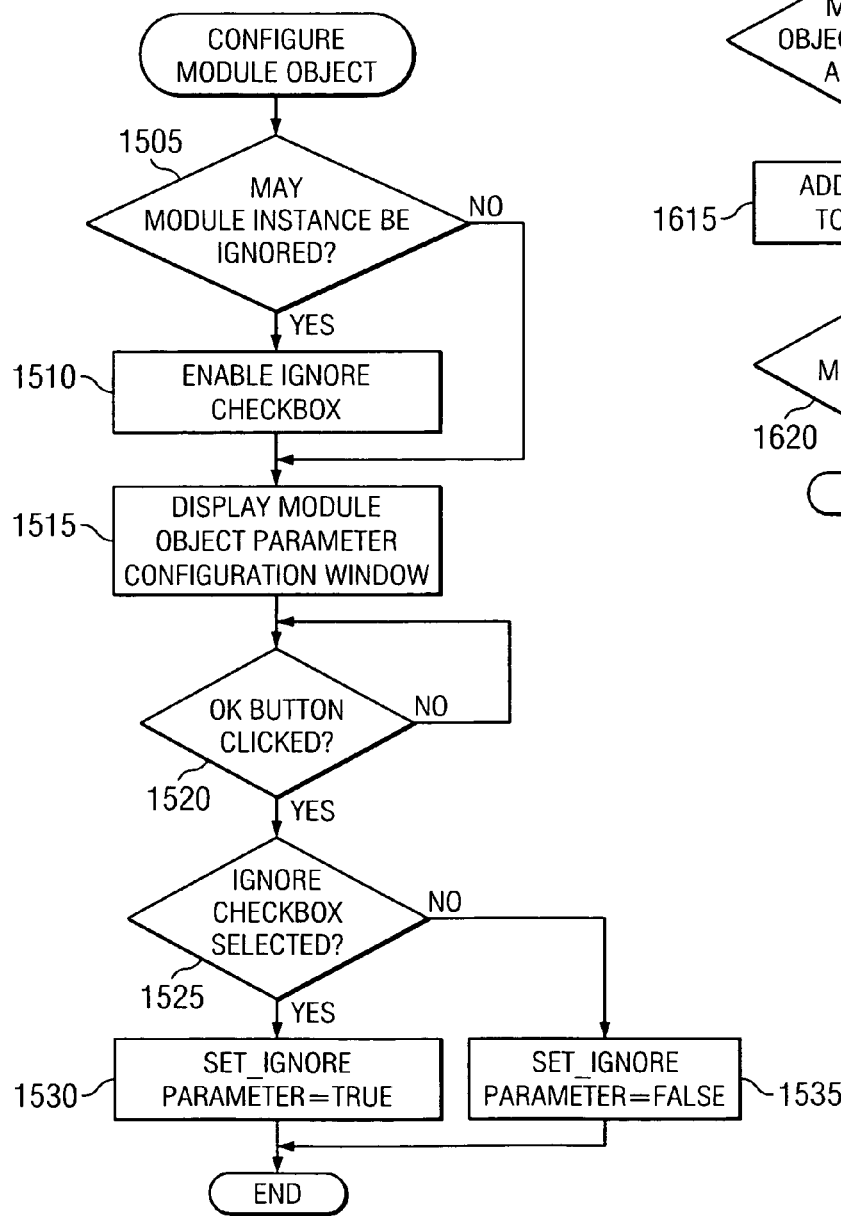
FIG. 15 is a flowchart representative of example method that may be carried out to perform parameter configuration of a module object.
Figure 16:
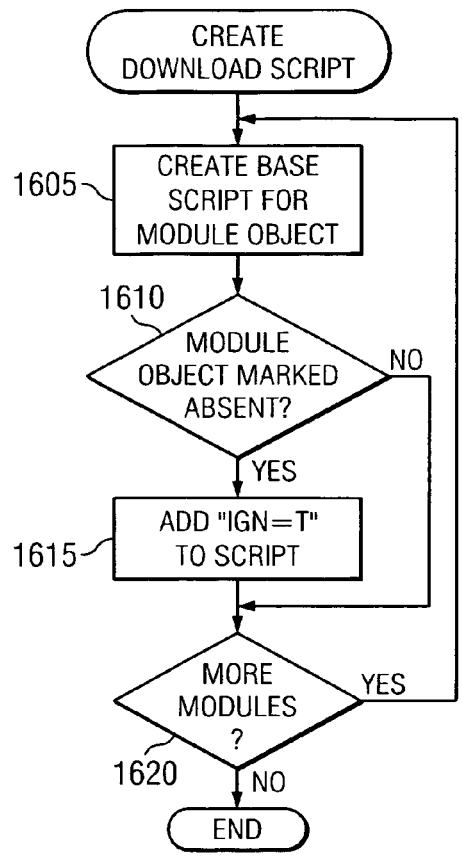
FIG. 16 is a flowchart representative of example method that may be carried out to create the example download script of FIG. 14.
Figure 17:
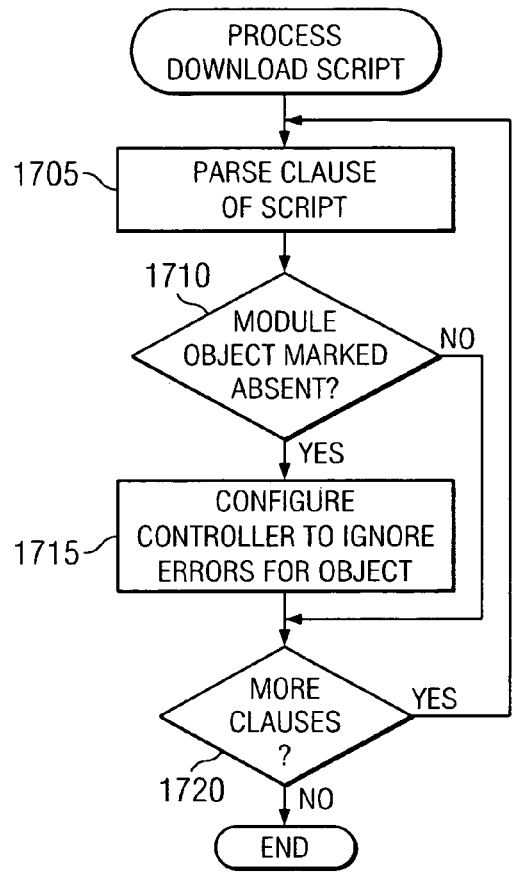
FIG. 17 is a flowchart representative of example method that may be carried out to process the example download script of FIG. 14.

Any of the example methods and/or processes described above to, for example, configure parameters of a module objects, to create a download script, and/or to process a download script can be implemented using a program, application and/or utility executed by a processor, a controller, a computer, a workstation, etc. FIGS. 15, 16 and 17 are flowcharts representative of example methods that may be used and/or carried out to configure parameters of a module objects, to create a download script, and to process a download script, respectively. The example methods of FIGS. 15, 16 and/or 17 may be implemented using machine accessible instructions executed by a processor, a controller and/or any other suitable processing device. For example, the machine accessible instructions used to implement the example methods of FIG. 15, 16 and/or 17 may be embodied in coded instructions stored on a tangible medium such as a flash memory, ROM and/or RAM associated with a processor (e.g., the example processors 23 of FIG. 1 and/or the processor 1805 discussed below in connection with FIG. 18). Alternatively, some or all of the example methods of FIGS. 15, 16 and/or 17 may be implemented using any of a variety of application specific integrated circuit(s) (ASIC(s)), programmable logic device(s) (PLD(s)), field programmable logic device(s) (FPLD(s)), discrete logic, hardware, firmware, etc. Also, some or all of the example methods of FIGS. 15, 16 and/or 17 may be implemented manually or as any combination(s) of any of the foregoing techniques, for example, any combination of firmware, software, discrete logic and/or hardware. Further, although the example methods of FIGS. 15, 16 and 17 are described with reference to the flowcharts of FIGS. 15, 16 and 17 persons of ordinary skill in the art will readily appreciate that many other methods of configuring parameters of a module objects, creating download scripts, and/or processing download scripts, may be employed. For example, the order of execution of the blocks may be changed, and/or some of the blocks described may be changed, eliminated, sub-divided, or combined. Additionally, persons of ordinary skill in the art will appreciate that the example methods of FIG. 15, 16 and/or 17 may be carried out sequentially and/or carried out in parallel by, for example, separate processing threads, processors, devices, discrete logic, circuits, etc.

The example method of FIG. 15 may be executed and/or carried out to configure parameters of a module object. The example method of FIG. 15 begins when, for example, a configuration engineer selects a module object to configure. If the configuration engineer is enabled to identify that the module instance is to be ignored (e.g., via the example check box 905 of FIG. 9) (block 1505), one or more additional and/or alternative elements (e.g., the example check box 1005 of FIG. 10) of a configuration window, screen, dialog box, etc. are enabled (block 1510). Such elements may be used by the configuration engineer to identify and/or configure the absence of equipment. At block 1505, the PERMIT_INSTANCES_2B_IGNORED property of a module class object from which the module object was created can be used, for example, to determine if a configuration to ignore the module instance is allowed and/or enabled. Control then proceeds to block 1515.

Returning to block 1505, if the configuration engineer is not enabled to configure the module instance as to be ignored (block 1505), control proceeds to block 1515 without enabling additional and/or alternative elements of a configuration window, screen, dialog box, etc.

At block 1515, a configuration window, screen, dialog box, etc. that allows the configuration engineer to configure parameters of the module object is displayed (block 1515). If the configuration engineer is enabled to configure a module instance as to be ignored, additional elements of the configuration window, screen, dialog box, etc may be enabled as set at block 1510. Once the configuration engineer has finished configuring the module object and/or creating a variant and, for example, pressed an "OK" button of the presented configuration window, screen, dialog box, etc. (block 1520), the state of, for example, a checkbox to configure the equipment as absent is determined (block 1525). If the equipment is configured as absent (e.g., the example check box 1005 of FIG. 10 is selected) (block 1525), the equipment is marked as absent by setting, for example, the _IGNORE parameter of the module object to TRUE (block 1530). Control then exits from the example method of FIG. 15. However, if the equipment is not configured as absent (e.g., the example check box 1005 of FIG. 10 is not selected) (block 1525), the equipment is marked as present by setting, for example, an _IGNORE parameter of the module object to FALSE (block 1535). Control then exits from the example method of FIG. 15. Alternatively at block 1535, the _IGNORE parameter could be left undefined.

The method of FIG. 16 may be used to create a download script for a process controller (e.g., any of the example controllers 12A-C of FIG. 1). For a presently considered module object associated with a particular process controller, a base download script clause is created (block 1605). If the presently considered module object is configured as absent (e.g., its _IGNORE parameter is set to TRUE) (block 1610), a field identifying the module object as absent (e.g., the example IGN field 1410 of FIG. 14) is added to the base download script clause (block 1615). If more module objects remain to be processed (block 1620), control returns to block 1605 to process the next module object. If no more module objects remain (block 1620), control exits from the example method of FIG. 16.

Returning to block 1610, if the presently considered module object is not configured as absent (e.g., its _IGNORE parameter is set to FALSE) (block 1610), control proceeds to block 1620 to determine if there are more module objects to process without adding an additional field to the download script clause.

The method of FIG. 17 may be used to process a download script at a process controller (e.g., any of the example controllers 12A-C of FIG. 1). A clause of the download script is extracted read and/or extracted from a download script and parsed to obtain the various fields of the clause (block 1705). If the presently considered module object corresponding to the clause is configured as absent (e.g., the example IGN field 1410 of FIG. 14 is set to TRUE) (block 1710), the controller is configured to ignore control routine errors and/or configuration corresponding to the module object (block 1715). If more clauses remain to be processed (block 1720), control returns to block 1705 to process the next clause. If no more clauses remain (block 1720), control exits from the example method of FIG. 17. Returning to block 1710, if the presently considered module object is not configured as absent (e.g., the example IGN field 1410 of FIG. 14 is set to FALSE) (block 1710), control proceeds to block 1720 to determine if there are more download script clauses to process.

Figure 18:
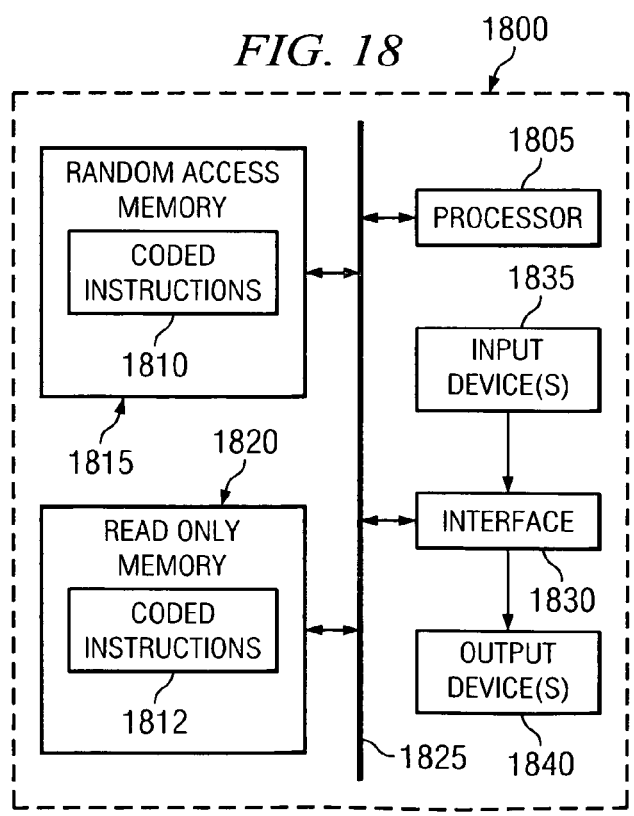
FIG. 18 is a schematic illustration of an example processor platform that may be used and/or programmed to carry out the example methods of FIGS. 15, 16 and/or 17.

FIG. 18 is a schematic diagram of an example processor platform 1800 that may be used and/or programmed to implement the example controllers 12A-C and/or the example workstations 14A-C of FIG. 1. For example, the processor platform 1800 can be implemented by one or more general purpose processors, cores, microcontrollers, etc.

The processor platform 1800 of the example of FIG. 18 includes at least one general purpose programmable processor 1805. The processor 1805 executes coded instructions 1810 and/or 1812 present in main memory of the processor 1805 (e.g., within a RAM 1815 and/or a ROM 1820). The processor 1805 may be any type of processing unit, such as a processor core, processor and/or microcontroller. The processor 1805 may execute, among other things, the example methods of FIGS. 15, 16 and 17 to perform parameter configuration for module objects, download script creation, and download script processing, respectively. The processor 1805 is in communication with the main memory (including a ROM 1820 and the RAM 1815) via a bus 1825. The RAM 1815 may be implemented by DRAM, SDRAM, and/or any other type of RAM device, and ROM may be implemented by flash memory and/or any other desired type of memory device. Access to the memory 1815 and 1820 maybe controlled by a memory controller (not shown). The RAM 1815 may be used to store and/or implement, for example, the example library of module class objects 52, 53, 54, 55 and/or 56, the control data stores 20, 22, the configuration database 25, and/or the control routines 19A-C.

The processor platform 1800 also includes an interface circuit 1830. The interface circuit 1830 may be implemented by any type of interface standard, such as an external memory interface, serial port, general purpose input/output, etc. One or more input devices 1835 and one or more output devices 1840 are connected to the interface circuit 1830. The input devices 1835 and/or output devices 1840 may be used to, for example, communicatively couple the example workstations 14A-C, the example controllers 12A-C, and/or any of a variety of control devices.

Although certain example methods, apparatus and articles of manufacture have been described herein, the scope of coverage of this patent is not limited thereto. Such example are intended to be non-limiting illustrative examples. On the contrary, this patent covers all methods, apparatus and articles of manufacture fairly falling within the scope of the appended claims either literally or under the doctrine of equivalents.

What is claimed is:

1. A method of creating a configuration entity for use in configuring a process plant, the method comprising:
    creating, via a processor, a class object representative of a process entity within the process plant that includes a first data structure representative of one or more process elements that make up the process entity;
    creating, via the processor, a module object based on the class object that includes a second data structure, the second data structure to include a configurable first indication to represent whether a specific process element that conforms to a first one of the one or more process elements that make up the process entity is absent from operation of the process entity; and
    the module object for use in a controller to perform process control activities associated with the process entity.

2. A method as defined in claim 1, further comprising binding the created module object to a specific process entity of the process plant represented by the class object.

3. A method as defined in claim 1, wherein creating the module object based on the class object creates a process element object for the specific process element, and wherein the second data structure contains a representation of the process element object, and the first indication is a parameter of the process element object.

4. A method as defined in claim 3, further comprising binding the process element object to the specific process element of the process plant if the specific process element is not configured as absent.

5. A method as defined in claim 1, further comprising presenting a user interface to create the module object from the class object and to bind the module object to the specific process entity of the process plant.

6. A method as defined in claim 1, wherein the second data structure further includes programming associated with the specific process element, and wherein the programming is to be executed during operation of the process plant based on the configurable first indication.

7. A method as defined in claim 6, further comprising controlling execution of the programming based on the first indication.

8. A method as defined in claim 6, wherein the first indication allows the programming to execute without an error when the specific process element is absent.

9. A method as defined in claim 1, wherein the class object includes a second indication that enables configuration of the first indication.

10. A method as defined in claim 9, further comprising presenting a user interface to facilitate configuration of the second indication.

11. A method as defined in claim 9, further comprising enabling configuration of the first indication when the second indication has a first predetermined value.

12. A method as defined in claim 9, further comprising applying changes made to the class object to the module object.

13. A method as defined in claim 12, wherein the changes may be applied to the module object regardless of a value of the first indication.

14. A method as defined in claim 12, further comprising preserving a state of the first indication when changes are made to the module object.

15. A method as defined in claim 1, further comprising presenting a user interface to facilitate configuration of the first indication.

16. A method as defined in claim 1, further comprising processing bulk input data to configure the first indication.

17. A method as defined in claim 1, further comprising presenting a user interface that indicates that the specific process element is being ignored.

18. A method as defined in claim 1, wherein the second data structure further includes one or more additional indications of one or more present specific process elements that conform to one or more process elements that make up the process entity, and wherein programming associated with the one or more present specific process elements is to be executed during operation of the process plant.

19. A method as defined in claim 1, wherein the process entity is a unit and the one or more process elements are sub-elements of the unit.

20. A method as defined in claim 19, wherein the one or more sub-elements of the unit include an equipment element.

21. A method as defined in claim 1, wherein the process entity is an equipment entity and the one or more process elements are sub-elements of the equipment entity.

22. A method as defined in claim 1, further comprising creating a download script for a controller of the process plant based on the first indication.

23. A method as defined in claim 1, further comprising providing the first indication to a controller of the process plant.

24. An apparatus to configure a process plant, the apparatus comprising:
a processor; and
a machine accessible medium having instructions stored thereon that, when executed, cause the processor to:
store a class object in a memory, the class object representative of a process entity within the process plant and including:
a first data structure representative of one or more process elements that make up the process entity; and
a second data structure representative of a module object created from the class object, the module object to include a configurable first indication whether a specific process element that conforms to a first one of the one or more process elements that make up the process entity is absent from operation of the process entity, the module object for use in a controller to perform process control activities associated with the process entity.

25. An apparatus as defined in claim 24, wherein the first data structure includes a binding of the module object to a specific process entity of the process plant represented by the class object.

26. An apparatus as defined in claim 24, wherein the module object includes a reference to a process element object for the specific process element, and wherein the second data structure includes a reference of the process element object, and the first indication is a parameter of the process element object.

27. An apparatus as defined in claim 26, wherein the process element object includes a binding of the process element object to the specific process element of the process plant if the specific process element is not configured as absent.

28. An apparatus as defined in claim 24, wherein the module object further includes programming associated with the specific process element, and wherein the programming is to be executed during operation of the process plant based on the first indication.

29. An apparatus as defined in claim 28, wherein the first indication allows the programming to execute without an error when the specific process element is absent.

30. An apparatus as defined in claim 28, wherein the first indication is a parameter associated with the second data structure and is useable to control execution of the programming.

31. An apparatus as defined in claim 28, wherein the first indication is a parameter representative of a value to control a flow of the programming.

32. An apparatus as defined in claim 24, wherein the module object is created from the class object, and the class object includes a second indication that enables configuration of the first indication.

33. An apparatus as defined in claim 32, wherein a value of the first indication is selectable when the second indication has a first predetermined value.

34. An apparatus as defined in claim 32, wherein changes made to the class object are inherited by the module object.

35. An apparatus as defined in claim 32, wherein changes made to the class object are automatically applied to the module object while preserving a state of the first indication.

36. An apparatus as defined in claim 24, wherein the first indication is user configurable via a configuration interface.

37. An apparatus as defined in claim 24, wherein the first indication is configurable via a bulk processing application.

38. An apparatus as defined in claim 24, wherein the second data structure further includes one or more additional indications of one or more present specific process elements that conform to one or more process elements that make up the process entity, and programming associated with the one or more present specific process elements to be executed during operation of the process plant.

39. An apparatus as defined in claim 24, wherein the process entity is a unit and the one or more process elements are sub-elements of the unit.

40. An apparatus as defined in claim 39, wherein the one or more sub-elements of the unit include an equipment element.

41. An apparatus as defined in claim 24, wherein the process entity is an equipment entity and the one or more process elements are sub-elements of the equipment entity.

42. An article of manufacture storing machine readable instructions which, when executed, cause a machine to:
create a class object representative of a process entity within the process plant that includes a first data structure representative of one or more process elements that make up the process entity;
create a module object based on the class object that includes a second data structure, the second data structure to include a configurable first indication to represent whether a specific process element that conforms to a first one of the one or more process elements that make up the process entity is absent from operation of the process entity; and
the module object for use in a controller to perform process control activities associated with the process entity.

43. An article of manufacture as defined in claim 42, wherein the machine readable instructions, when executed, cause the machine to bind the created module object to a specific process entity of the process plant represented by the class object.

44. An article of manufacture as defined in claim 42, wherein the machine readable instructions, when executed, cause the machine to present a user interface to create the module object from the class object and to bind the module object to the specific process entity of the process plant.

45. An article of manufacture as defined in claim 42, wherein the machine readable instructions, when executed, cause the machine to control execution of the programming based on the first indication.

46. An article of manufacture as defined in claim 42, wherein the class object includes a second indication that enables configuration of the first indication.

47. An article of manufacture as defined in claim 46, wherein the machine readable instructions, when executed, cause the machine to present a user interface to facilitate configuration of the second indication.

48. An article of manufacture as defined in claim 46, wherein the machine readable instructions, when executed, cause the machine to enable configuration of the first indication when the second indication has a first predetermined value.

49. An article of manufacture as defined in claim 46, wherein the machine readable instructions, when executed, cause the machine to apply changes made to the class object to the module object.

50. An article of manufacture as defined in claim 42, wherein the machine readable instructions, when executed, cause the machine to present a user interface to facilitate configuration of the first indication.

51. A configuration system to configure a process plant, the configuration system comprising:
- a library that stores a module class object, the module class object representing a process entity within the process plant and including associations of one or more process elements of the process entity;
- a processor; and
- machine accessible instructions which, when executed, cause the processor to:
- present a first user interface to create a module object data structure based on the module class object and to associate the one or more process elements with specific process elements of the process entity;
- present a second user interface to configure an absence indication to indicate the absence from operation of the process entity; and
- sending the module object to a controller for use in performing process control activities associated with the process entity.

52. A configuration system as defined in claim 51, wherein the machine readable instructions, when executed, cause the processor to present a third user interface to enable configuring the absence indication to indicate the absence of the particular one of the one or more process elements.

53. A configuration system as defined in claim 52, wherein the second user interface is enabled via the third user interface.

54. A configuration system as defined in claim 51, wherein the machine readable instructions, when executed, cause the processor to present a third user interface to configure a program for the particular one of the one or more process elements based on the absence indication.

55. A configuration system as defined in claim 51, wherein the machine readable instructions, when executed, cause the processor to store the absence indication in the module object data structure.

56. A configuration system as defined in claim 51, wherein the machine readable instructions, when executed, cause the processor to set a property of the module class object based on the first user interface, wherein the property is stored in the library.

57. A configuration system as defined in claim 51, wherein the machine readable instructions, when executed, cause the processor to create a download script for the process entity based on the created module object and the absence indication.

58. A configuration system as defined in claim 51, wherein the machine readable instructions, when executed, cause the processor to provide the absence indication to a controller of the process plant.

59. A configuration system as defined in claim 58, wherein the machine readable instructions, when executed, cause the processor to write the absence indication into a memory of the controller.

60. A configuration system as defined in claim 51, wherein the process entity is a unit and the one or more process elements are sub-elements of the unit.

61. A configuration system as defined in claim 60, wherein the one or more sub-elements of the unit include an equipment element.

62. A configuration system as defined in claim 51, wherein the process entity is an equipment entity and the one or more process elements are sub-elements of the equipment entity.

* * * * *

UNITED STATES PATENT AND TRADEMARK OFFICE
CERTIFICATE OF CORRECTION

| | | |
|---|---|---|
| PATENT NO. | : 7,848,829 B2 | Page 1 of 1 |
| APPLICATION NO. | : 11/537138 | |
| DATED | : December 7, 2010 | |
| INVENTOR(S) | : Nixon et al. | |

It is certified that error appears in the above-identified patent and that said Letters Patent is hereby corrected as shown below:

Title Page, References Cited, insert -- 2003/0236576 A1* 12/2003 Resnick et al. 700/9 --

Column 39, line 26 (claim 51), after "absence" insert -- of a particular one of the one or more process elements --

Signed and Sealed this
Fifteenth Day of March, 2011

David J. Kappos
*Director of the United States Patent and Trademark Office*